United States Patent
Hamano et al.

(10) Patent No.: US 11,539,874 B2
(45) Date of Patent: Dec. 27, 2022

(54) IMAGE-CAPTURING APPARATUS AND CONTROL METHOD THEREOF

(71) Applicant: CANON KABUSHIKI KAISHA, Tokyo (JP)

(72) Inventors: Hideyuki Hamano, Kawasaki (JP); Akihiko Kanda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 17/140,058

(22) Filed: Jan. 2, 2021

(65) Prior Publication Data

US 2021/0127067 A1    Apr. 29, 2021

Related U.S. Application Data

(63) Continuation of application No. 16/180,294, filed on Nov. 5, 2018, now Pat. No. 10,924,655.

(30) Foreign Application Priority Data

Nov. 6, 2017    (JP) .............................. JP2017-213674
Jun. 28, 2018   (JP) .............................. JP2018-123724

(51) Int. Cl.
*H04N 5/232*     (2006.01)
*H04N 5/369*     (2011.01)
(Continued)

(52) U.S. Cl.
CPC ..... *H04N 5/232122* (2018.08); *H04N 5/2256* (2013.01); *H04N 5/2354* (2013.01);
(Continued)

(58) Field of Classification Search
None
See application file for complete search history.

(56) References Cited

U.S. PATENT DOCUMENTS

2003/0043290 A1*   3/2003   Sasaki ................. H04N 5/2256
                                                 348/E5.029
2004/0109081 A1    6/2004   Sumi
(Continued)

FOREIGN PATENT DOCUMENTS

JP    06-094988 A    4/1994
JP    11-352391 A    12/1999
(Continued)

OTHER PUBLICATIONS

A Jul. 23, 2020 Chinese Office Action, which is enclosed with an English Translation, that issued in Chinese Patent Application No. 201811314266.8.
(Continued)

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

The image-capturing apparatus (100) includes an image sensor (14), a focus detector (42) performing focus detection using output from the image sensor; and a controller (50) configured to cause the focus detector to perform the focus detection and configured to control emission of a light emitter for illuminating an object and movement of a focus element for focusing. The controller selectively performs: a first focus detection process that causes the focus detector to perform the focus detection with the focus element being stopped while causing the light emitter to intermittently emit light; and a second focus detection process that causes the focus detector to perform the focus detection with the focus element being moved while causing the light emitter to intermittently emit the light.

11 Claims, 20 Drawing Sheets

(51) Int. Cl.
*H04N 5/225* (2006.01)
*H04N 5/235* (2006.01)

(52) U.S. Cl.
CPC .......... *H04N 5/23245* (2013.01); *H04N 5/232121* (2018.08); *H04N 5/232941* (2018.08); *H04N 5/36961* (2018.08)

(56) References Cited

U.S. PATENT DOCUMENTS

| | | | |
|---|---|---|---|
| 2008/0124067 A1* | 5/2008 | Eliasson | G03B 15/03 348/E5.038 |
| 2008/0193119 A1 | 8/2008 | Miyazaki | |
| 2010/0033677 A1 | 2/2010 | Jelinek | |
| 2010/0073507 A1* | 3/2010 | Honjo | H04N 5/2354 348/222.1 |
| 2010/0157134 A1 | 6/2010 | Kawarada | |
| 2013/0021508 A1* | 1/2013 | Uranishi | H04N 5/232122 348/222.1 |
| 2013/0155275 A1* | 6/2013 | Shimizu | H04N 9/735 348/370 |
| 2014/0178059 A1* | 6/2014 | Miyazaki | G03B 15/03 396/166 |
| 2014/0340572 A1* | 11/2014 | Sato | H04N 5/225 348/370 |
| 2015/0103232 A1* | 4/2015 | Hamano | H04N 5/36961 348/349 |

FOREIGN PATENT DOCUMENTS

| | | |
|---|---|---|
| JP | 2001-027724 A | 1/2001 |
| JP | 2001-108888 A | 4/2001 |
| JP | 2002-139664 A | 5/2002 |
| JP | 1627796 A | 6/2005 |
| JP | 1716083 A | 1/2006 |
| JP | 2006-301150 A | 11/2006 |
| JP | 2007-071193 A | 3/2007 |
| JP | 2007-121427 A | 5/2007 |
| JP | 2008-035243 A | 2/2008 |
| JP | 2011-107716 A | 6/2011 |
| JP | 102236148 A | 11/2011 |
| JP | 2013-219761 A | 10/2013 |
| JP | 2014-182360 A | 9/2014 |
| JP | 104580851 A | 4/2015 |
| JP | 2015-102766 A | 6/2015 |
| JP | 2015-161776 A | 9/2015 |
| JP | 2017-009932 A | 1/2017 |
| JP | 2017-139740 A | 8/2017 |
| JP | 2017-192028 A | 10/2017 |

OTHER PUBLICATIONS

A Nov. 16, 2021 Japanese Office Action, which is enclosed with an English Translation, that issued in Japanese Patent Application No. 2018-123724.

In the Jul. 5, 2022 Japanese Office Action, which is enclosed with an English Translation, that issued in Japanese Patent Application No. 2020-214995.

* cited by examiner

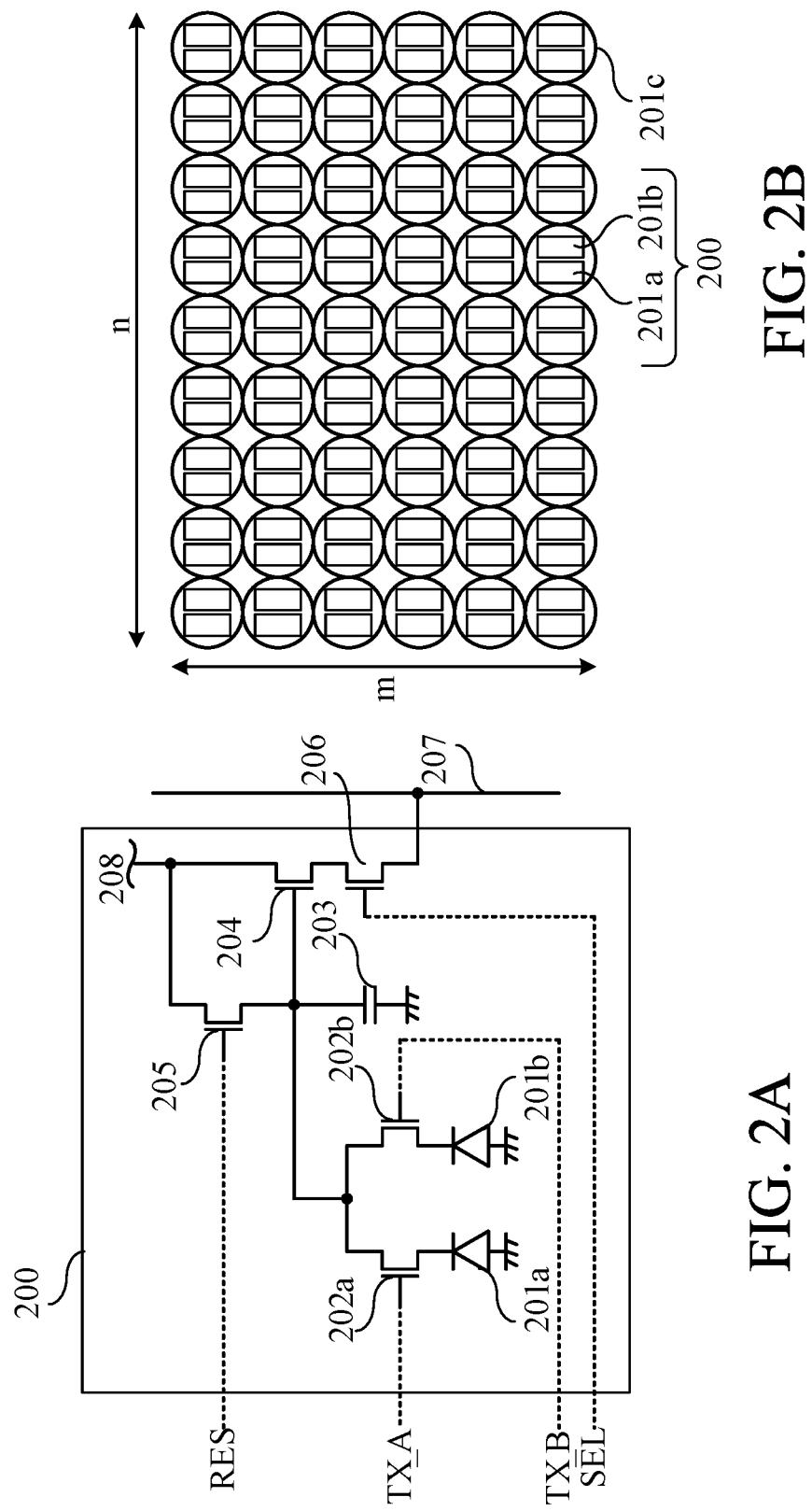

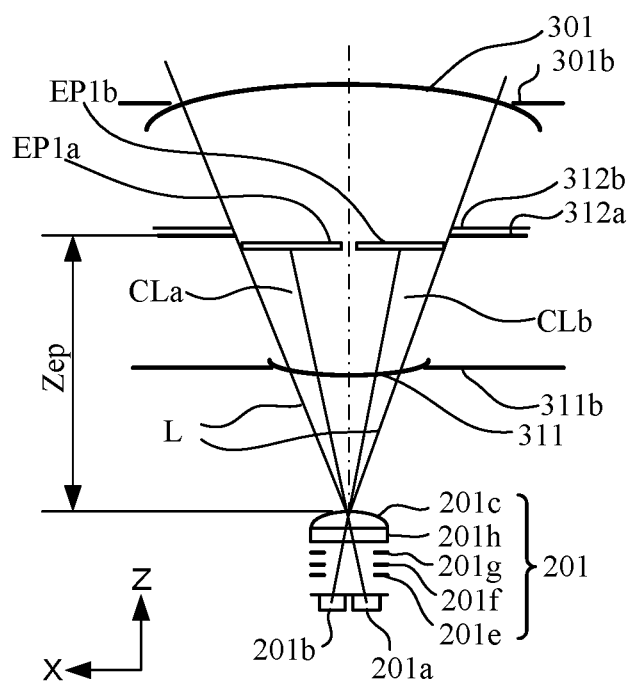 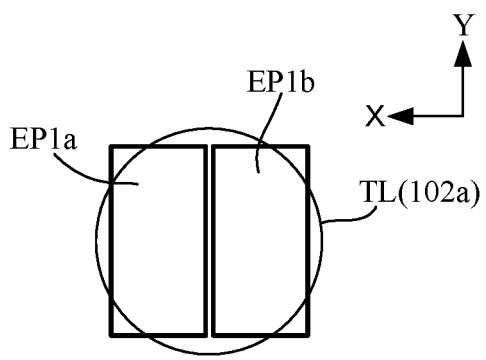
FIG. 3A  FIG. 3B
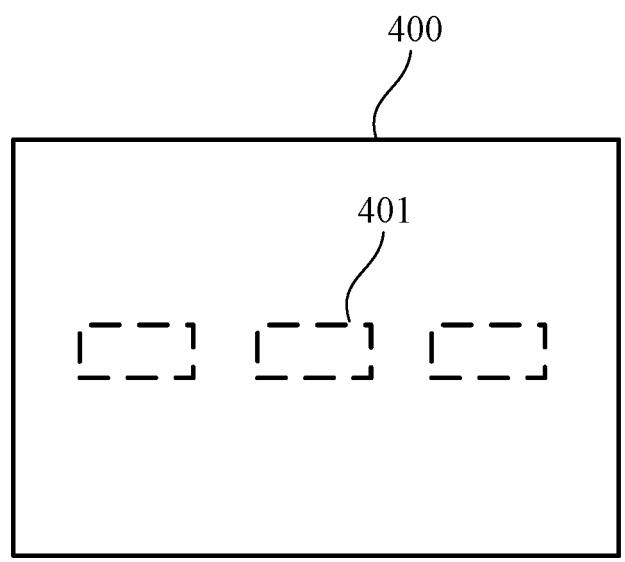
FIG. 4

| OBJECT'S CONTRAST | AF LIGHT FLUX DIAMETER | | | | |
|---|---|---|---|---|---|
| | | <F0 | F0≤, <F1 | F1≤, <F2 | F2≤ |
| | <C0 | Def11 | Def12 | Def13 | Def14 |
| | C0≤, <C1 | Def21 | Def22 | Def23 | Def24 |
| | C1≤, <C2 | Def31 | Def32 | Def33 | Def34 |
| | C2≤ | Def41 | Def42 | Def43 | Def44 |

IMAGE-CAPTURING APPARATUS AND CONTROL METHOD THEREOF

CROSS-REFERENCE TO RELATED APPLICATION

This application is a continuation of application Ser. No. 16/180,294, filed Nov. 5, 2018, the entire disclosure of which is hereby incorporated by reference.

BACKGROUND OF THE INVENTION

Field of the Invention

The present invention relates to an image-capturing apparatus using an assist light in focus detection using an image sensor.

Description of the Related Art

An image-capturing apparatus performing focus detection by a so-called imaging-surface phase difference detection method using an image sensor is disclosed in Japanese Patent Laid-Open No. 2014-182360. A method performing focus detection using an assist light emitted toward an object in a case where it is difficult to perform the focus detection because the object is dark or the like is disclosed in Japanese Patent Laid-Open No. 6-94988.

However, using the assist light enables the focus detection while the assist light is emitted. Thus, in a case where the focus detection using the assist light fails due to some reasons, it is necessary to again emit the assist light to perform the focus detection. Japanese Patent Laid-Open No. 2014-182360 discloses a method of performing pupil-division by a microlens provided to each pixel including paired photoelectric convertors to produce paired focus detection signals (phase difference image signals). This method only detects a small defocus amount because of a short base length between the paired photoelectric convertors. Therefore, the focus detection using the assist light is highly likely to fail, which results in increasing the number of emissions of the assist light until the focus detection succeeds.

SUMMARY OF THE INVENTION

The present invention provides an image-capturing apparatus capable of performing a high-speed focus detection using the assist light while reducing the number of emissions of the assist light.

The present invention provides as an aspect thereof an image-capturing apparatus including an image sensor configured to capture an object image formed by an image-capturing optical system, a focus detector configured to perform focus detection using output from the image sensor, and a controller configured to cause the focus detector to perform the focus detection and configured to control emission of a light emitter for illuminating an object and movement of a focus element for focusing. The controller is configured to selectively perform a first focus detection process that causes the focus detector to perform the focus detection with the focus element being stopped while causing the light emitter to intermittently emit light, and a second focus detection process that causes the focus detector to perform the focus detection with the focus element being moved while causing the light emitter to intermittently emit the light.

The present invention provides as another aspect thereof a method of controlling an image-capturing apparatus comprising an image sensor configured to capture an object image formed by an image-capturing optical system, and a focus detector configured to perform focus detection using output from the image sensor. The method includes the step of enabling emission of a light emitter for illuminating an object, the step of enabling movement of a focus element for focusing, and the step of selectively performing a first focus detection process that causes the focus detector to perform the focus detection with the focus element being stopped while causing the light emitter to intermittently emit light, and a second focus detection process that causes the focus detector to perform the focus detection with the focus element being moved while causing the light emitter to intermittently emit the light.

The present invention provides as yet another aspect thereof an image-capturing apparatus including an image sensor configured to capture an object image formed by an image-capturing optical system, a focus detector configured to perform focus detection using output from the image sensor, and a controller configured to cause the focus detector to perform the focus detection and configured to control emission of a light emitter for illuminating an object. The controller is configured to acquire multiple focus detection results by causing the focus detector to perform multiple focus detections while causing the light emitter to emit light with mutually different light emission amounts in the respective focus detections or by setting, in the focus detection, mutually different gains for signals obtained from the image sensor, and configured to set, by using the multiple focus detection results, a light emission amount of the light emitter or a gain for the signal from the image sensor for a subsequent focus detection.

The present invention provides as still another aspect thereof an image-capturing apparatus including an image sensor configured to capture an object image formed by an image-capturing optical system, a focus detector configured to perform focus detection using output from the image sensor, and a controller configured to cause the focus detector to perform the focus detection and configured to control emission of a light emitter for illuminating an object and movement of a focus element for focusing. The controller is configured to selectively perform, when a defocus amount as a focus detection result has a first reliability, a first focus detection process that causes the focus detector to perform the focus detection with the focus element being stopped while causing the light emitter to intermittently emit light, when the defocus amount has a second reliability higher than the first reliability, a second focus detection process that causes the focus detector to perform the focus detection with the focus element being moved while causing the light emitter to intermittently emit the light, when the defocus amount has a third reliability higher than the second reliability, a third focus detection process that causes the focus detector to perform the focus detection while causing the light emitter to intermittently emit the light, and when a number of intermittent emissions of the light emitter is a predetermined number or more and the defocus amount has the second reliability, a fourth focus detection process that causes the focus detector to perform the focus detection with the focus element being moved.

The present invention provides as yet another aspect thereof a method of controlling an image-capturing apparatus comprising an image sensor configured to capture an object image formed by an image-capturing optical system, and a focus detector to perform focus detection using output from the image sensor. The method includes the step of enabling emission of a light emitter for illuminating an object, the step of enabling movement of a focus element for focusing, and the step of selectively performing, when a defocus amount as a focus detection result has a first reliability, a first focus detection process that causes the focus detector to perform the focus detection with the focus element being stopped while causing the light emitter to intermittently emit light, when the defocus amount has a second reliability higher than the first reliability, a second focus detection process that causes the focus detector to perform the focus detection with the focus element being moved while causing the light emitter to intermittently emit the light, when the defocus amount has a third reliability higher than the second reliability, a third focus detection process that causes the focus detector to perform the focus detection while causing the light emitter to intermittently emit the light, and when a number of intermittent emissions of the light emitter is a predetermined number or more and the defocus amount has the second reliability, a fourth focus detection process that causes the focus detector to perform the focus detection with the focus element being moved.

The present invention provides as further another aspect thereof a method of controlling an image-capturing apparatus comprising an image sensor configured to capture an object image formed by an image-capturing optical system, and a focus detector configured to perform focus detection using output from the image sensor. The method includes the step of enabling emission of a light emitter for illuminating an object, the step of acquiring multiple focus detection results by causing the focus detector to perform multiple focus detections while causing the light emitter to emit light with mutually different light emission amounts in the respective focus detections or by setting, in the focus detection, mutually different gains for signals obtained from the image sensor, and the step of setting, by using the multiple focus detection results, a light emission amount of the light emitter or a gain for the signal from the image sensor for a subsequent focus detection.

The present invention provides as yet further another aspect thereof a non-transitory computer-readable storage medium for storing a computer program causing a computer to execute a control process for controlling an image-capturing apparatus. The control process is according to any one of the above-described methods.

Further features of the present invention will become apparent from the following description of exemplary embodiments with reference to the attached drawings.

BRIEF DESCRIPTION OF THE DRAWINGS

FIGS. 2A to 2C respectively illustrate a pixel circuit, a pixel arrangement and a sensor circuit of an image sensor used in the image-capturing apparatus of Embodiment 1.

FIGS. 3A and 3B illustrate pupil division in the image-capturing apparatus of Embodiment 1.

FIG. 4 illustrates focus detection areas provided in an image-capturing area in Embodiment 1.

DESCRIPTION OF THE EMBODIMENTS

Exemplary embodiments of the present invention will hereinafter be described with reference to the accompanying drawings.

Embodiment 1

Figure 1:
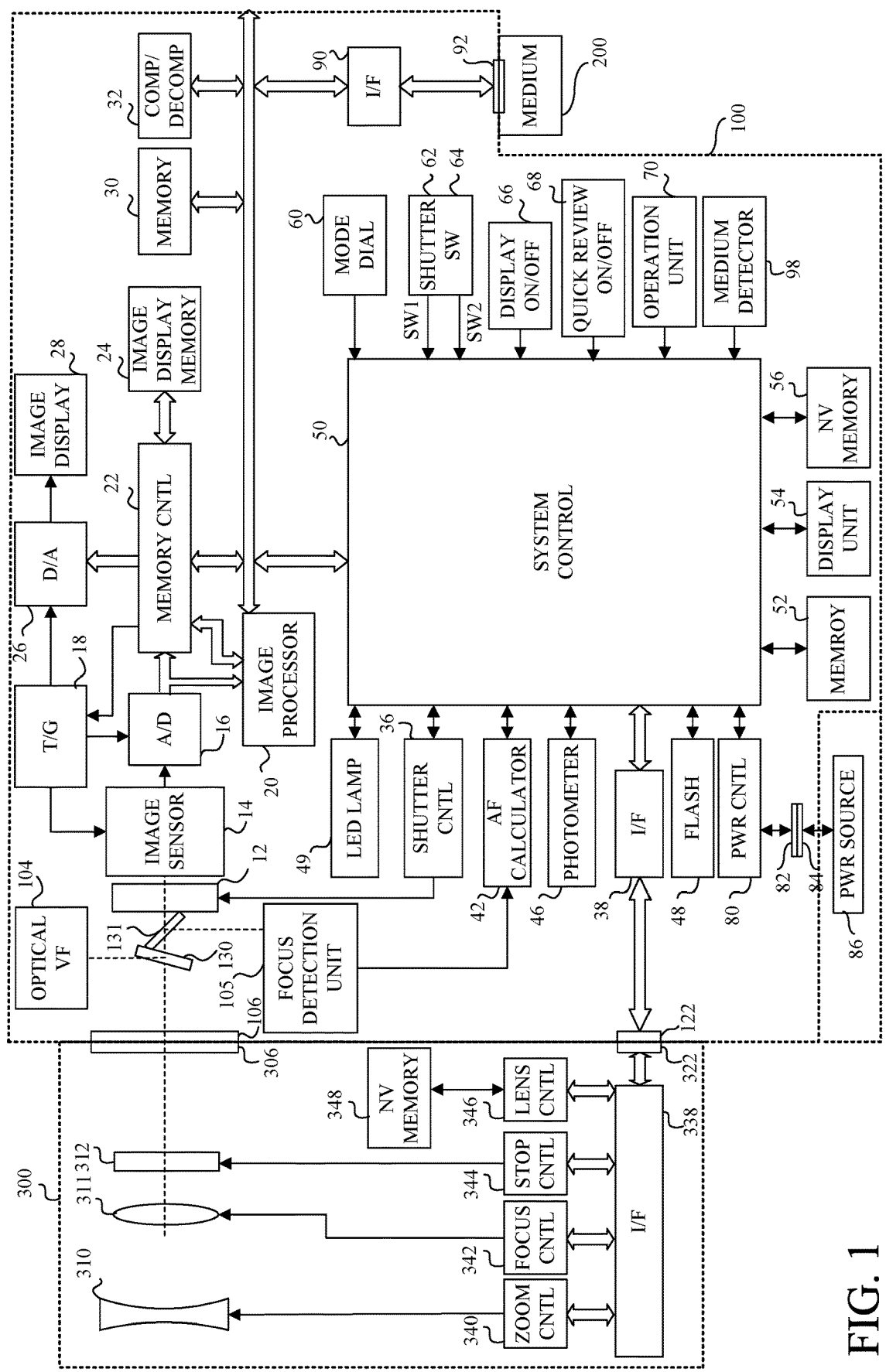
FIG. 1 is a block diagram illustrating a configuration of an image-capturing apparatus that is Embodiment 1 of the present invention.

FIG. 1 illustrates the configuration of a camera system including an image-capturing lens (interchangeable lens) 300 and a camera body (hereinafter simply referred to as a camera) 100 as an image-capturing apparatus that is a first embodiment (Embodiment 1) of the present invention and to which the image-capturing lens 300 is interchangeably (detachably) attached. Description will be first made of the configuration of the camera 100.

The camera 100 has a camera mount 106 to which a lens mount 306 of the interchangeable lens 300 is mechanically and electrically detachably attached. The camera mount 106 and the lens mount 306 are provided with connectors 122 and 322 as electrical contact portions for enabling electrical connection between the image-capturing lens 300 and the camera 100.

A light flux from an object enters the image-capturing lens 300, passes through an image-capturing optical system in the image-capturing lens 300, and then is reflected upward by a main mirror 130 to enter an optical viewfinder 104. The optical viewfinder 104 enables therethrough a user to observe an object image as an optical image of the object. The optical viewfinder 104 includes thereinside a part of a display unit 54, which will be described later. The display unit 54 displays focus detection areas, an in-focus state, a hand jiggling warning, an aperture value and an exposure correction value.

The main mirror 130 is a half mirror. A part of the light flux reaching the main mirror 130 disposed in an image-capturing optical path from the image-capturing lens 300 passes through the main mirror 130 and is reflected downward by a sub mirror 131 disposed at the back of the main mirror 130 to be introduced to a focus detection unit 105.

The focus detection unit 105 is constituted by a secondary image-forming optical system and photoelectric convertors and performs focus detection by a phase difference detection method. The focus detection unit 105 converts, by the photoelectric convertors forming paired line sensors, paired object images formed by the secondary image-forming optical system into paired electrical signals (paired phase difference image signals as focus detection signals) to output them to an AF (autofocus) calculator 42. The AF calculator 42 as a focus detector calculates a phase difference that is a shift amount between the paired phase difference image signals.

A system controller 50 as a controller calculates, from the calculated phase difference, a defocus amount as a focus detection result. A focus controller 342 in the image-capturing lens 300 performs a focusing process to move a focus lens 311 as a focus element included in the image-capturing optical system in a direction in which its optical axis extends (hereinafter referred to as "an optical axis direction") so as to decrease the defocus amount. Although in this embodiment focusing is performed by moving the focus lens 311 in the image-capturing optical system, the focusing may be performed by moving the image sensor 14 as a focus element in the optical axis direction.

When image capturing of a still image, an electronic viewfinder image or a moving image is performed after the focusing of the image-capturing lens 300, a quick-return mechanism causes the main and sub mirrors 130 and 131 to move outside the image-capturing optical path. Thereby, the light flux from the image-capturing lens 300 enters the image sensor 14 through a mechanical shutter 12 that controls an exposure amount of the image sensor 14.

The image sensor 14 is constituted by a photoelectric conversion element such as a CMOS sensor and captures (photoelectrically converts) an object image formed by the light flux from the image-capturing lens 300. After the image capturing, the quick-return mechanism causes the main and sub mirrors 130 and 131 to move inside the image-capturing optical path.

An electrical signal (analog image-capturing signal) produced by photoelectric conversion by the image sensor 14 is converted by an A/D converter 16 into a digital image-capturing signal. A timing generator 18 is controlled by a memory controller 22 and the system controller 50 to supply a clock signal and control signals to the image sensor 14, the A/D converter 16 and a D/A converter 26. An image processor 20 performs, on the digital image-capturing signal from the A/D converter 16 or the memory controller 22, image processes such as a pixel interpolation process and a color conversion process to produce image data. The image processor 20 further performs various calculation processes using the produced image data.

The image sensor 14 includes, as its all pixels or a part thereof, pixels used for focus detection by an imaging-surface phase difference detection method. The image processor 20 converts, in the produced image data, partial image data corresponding to a focus detection area, which will be described later, into focus detection data. The focus detection data is sent to the AF calculator 42 through the system controller 50. The AF calculator 42 causes the focus controller 342 in the image-capturing lens 300 to move the focus lens 311 to obtain an in-focus state.

In the camera 100 of this embodiment, the system controller 50 can produce, from the image data produced by the image processor 20, a contrast evaluation value that indicates a contrast state of the image data. The system controller 50 further can cause the focus controller 342 to move the focus lens 311 to a position where the contrast evaluation value becomes peak to obtain an in-focus state. This is an AF by a contrast detection method.

Thus, in an optical viewfinder observation state where the main and sub mirrors 130 and 131 are disposed inside the image-capturing optical path, an AF by the phase difference detection method (that is, a phase difference AF) is performed. On the other hand, in an electronic viewfinder observation state and a moving image-capturing state where the main and sub mirrors 130 and 131 are disposed outside the image-capturing optical path, an AF by the imaging-surface phase difference detection method (that is, an imaging-surface phase difference AF) and an AF by the contrast detection method (that is, a contrast AF), which use the image sensor 14, are performed.

The memory controller 22 controls the A/D converter 16, the timing generator 18, the image processor 20, an image display memory 24, the D/A converter 26, a memory 30 and a compressor-decompressor 32. As described above, the image data is produced by the image processor 20 to which the digital image-capturing data is input from the A/D converter 16. The image data is written to the image display memory 24 or the memory 30 through the memory controller 22. The digital image-capturing data from the A/D converter 16 may be directly written to the image display memory 24 or the memory 30 through the memory controller 22.

An image display unit 28 includes a display device such as a liquid crystal monitor. The image data written to the image display memory 24 is converted by the D/A converter 26 into analog image data, and the analog image data is displayed by the image display unit 28. The image display unit 28 sequentially displaying the image data (frame images) sequentially produced by image capturing provides a live-view image as the electronic viewfinder image.

The memory 30 stores still images and moving images produced by image capturing. The memory 30 is also used as a working area for the system controller 50. The compressor-decompressor 32 has a function of compressing and decompressing the image data by an ADCT (Adaptive Discrete Cosine Transform) or the like, reads the image data stored in the memory 30 and performs thereon a compression process or a decompression process to write the processed image data to the memory 30.

A shutter controller 36 uses photometry information from a photometer 46 to control the shutter 12 in cooperation with a stop controller 344 that drives an aperture stop 312 in the image-capturing lens 300. A camera interface 38 enables, through the connectors 122 and 322 and a lens interface 338, communication of control signals, status signals and various data between the camera 100 and the image-capturing lens 300. The camera interface 38 further enables power supply from the camera 100 to the image-capturing lens 300. The photometer 46 that receives the light flux passing through the image-capturing lens 300, reflected by the main mirror 130 and then passing through a photometry lens (not illustrated) performs an AE (autoexposure) process to measure a luminance of the object image. The photometer 46 also performs a light emission amount control process in cooperation with a flash unit 48. The flash unit 48 as a first light emitter that emits light toward the object has a function of emitting a flash light to brightly illuminate the object in still image capturing and a function of intermittently emitting an AF assist light (hereinafter referred to as "a flash assist light") to illuminate the object in focus detection. Instead of the photometer 46 performing the AE process, the system controller 50 may perform an AE control using a calculation result of a luminance of the image data produced by the image processor 20 on the shutter controller 36 in the camera 100 and the stop controller 344 in the image-capturing lens 300.

An LED lamp 49 as a second light emitter is a light source capable of constantly emitting (continuously emitting) an LED light for illuminating the object. The LED light emitted from the LED lamp 49 is used not only as an AF assist light (hereinafter referred to as "an LED assist light"), but also as light for reducing a so-called red-eye phenomenon and as an index indicating an image-capturing time in self-timer image capturing.

The system controller 50 controls the entire operations of the camera 100. A memory 52 stores constants, variables and computer programs used for operations of the system controller 50. Another part of the display unit 54 including a display device such as a liquid crystal display panel or an LED and a speaker displays operation statues and messages using characters, images or sounds. Specifically, the display unit 54 displays information on the number of images such as captured images and remaining capturable images, information on image-capturing conditions such as a shutter speed, the aperture value, the exposure correction value and emission or non-emission of the flash light, information on a remaining battery level, and date and time information. As described above, the part of the display unit 54 is provided inside the optical viewfinder 104.

A non-volatile memory 56, which is an EEPROM or the like, is an electrically writable and erasable memory. A mode dial 60, shutter switches (SW1 and SW2) 62 and 64, an image display ON/OFF switch 66, a quick-review ON/OFF switch 68 and an operation unit 70 are operated by the user to input various operation instructions to the system controller 50. The operation unit 70 includes a switch, a dial, a touch panel, an eye-gaze pointing device, a vocal recognition device and others.

A power controller 80 includes a battery detector, a DC/DC converter and a switch for switching an electrically energized block. The power controller 80 detects, through the battery detector, insertion or non-insertion of a battery, a type of the inserted battery and a remaining battery level, and controls the DC/DC converter depending on results of the above detections and instructions from the system controller 50 to supply required voltages to various blocks including a recording medium 200 for required time periods. Connectors 82 and 84 connect a power source 86 such as a primary battery (for example, an alkaline battery and a lithium battery), a secondary battery (for example, a NiCd battery, a NiMH battery and a lithium-ion battery) or an AC adapter to the camera 100.

An interface 90 has a function of connecting the recording medium 200 such as a memory card or a hard disc to the camera 100 through a connector 92 to which the recording medium 200 is physically connected. A recording medium attachment detector 98 detects that the recording medium 200 is connected to the connector 92.

Next, description will be made of the configuration of the image-capturing lens 300. The image-capturing lens 300 includes the image-capturing optical system constituted by a magnification-varying (zoom) lens 310 and the above-described focus lens 311 and aperture stop 312. A zoom controller 340 moves the zoom lens 310 in the optical axis direction to perform variation of magnification. The focus controller 342 moves the focus lens 311 in the optical axis direction to perform focusing. The stop controller 344 drives the aperture stop 312 depending on the photometry information received from the photometer 46 through the system controller 50.

A lens controller 346 controls the entire operations of the image-capturing lens 300. The lens controller 346 has a function of storing constants, variables and computer programs used for operations of the lens controller 346.

A non-volatile memory 348 stores identification information such as a unique product serial number of the image-capturing lens 300, optical information such as a full-open aperture value, a minimum aperture value and a focal length, and information on various current and previous setting values. The non-volatile memory 348 further stores frame information depending on the state of the image-capturing lens 300, and defocus related information. The frame information relates to "frames" that define a diameter of the light flux passing through the image-capturing lens (image-capturing optical system) 300. Specifically, the frame information includes distances of the "frames" from the image sensor 14 and radii of apertures of the "frames" through which the light flux passes. One of the "frames" is the aperture stop 312, and lens holders holding lenses constituting the image-capturing optical system are the other "frames". The "frames" depend on a position of the zoom lens 310 (that is, a zoom position) and a position of the focus lens 311 (that is, a focus position), so that the frame information is provided for each zoom position and each focus position. In the focus detection, the lens controller 346 selects proper frame information corresponding to the zoom and focus positions and sends the selected frame information to the system controller 50.

The defocus related information indicates defocus amounts for respective object distances from an end on an infinite side (infinite end) to an end on a close side (close end), and is stored dividedly for the respective object distances corresponding to the focus positions.

Figure 2C:
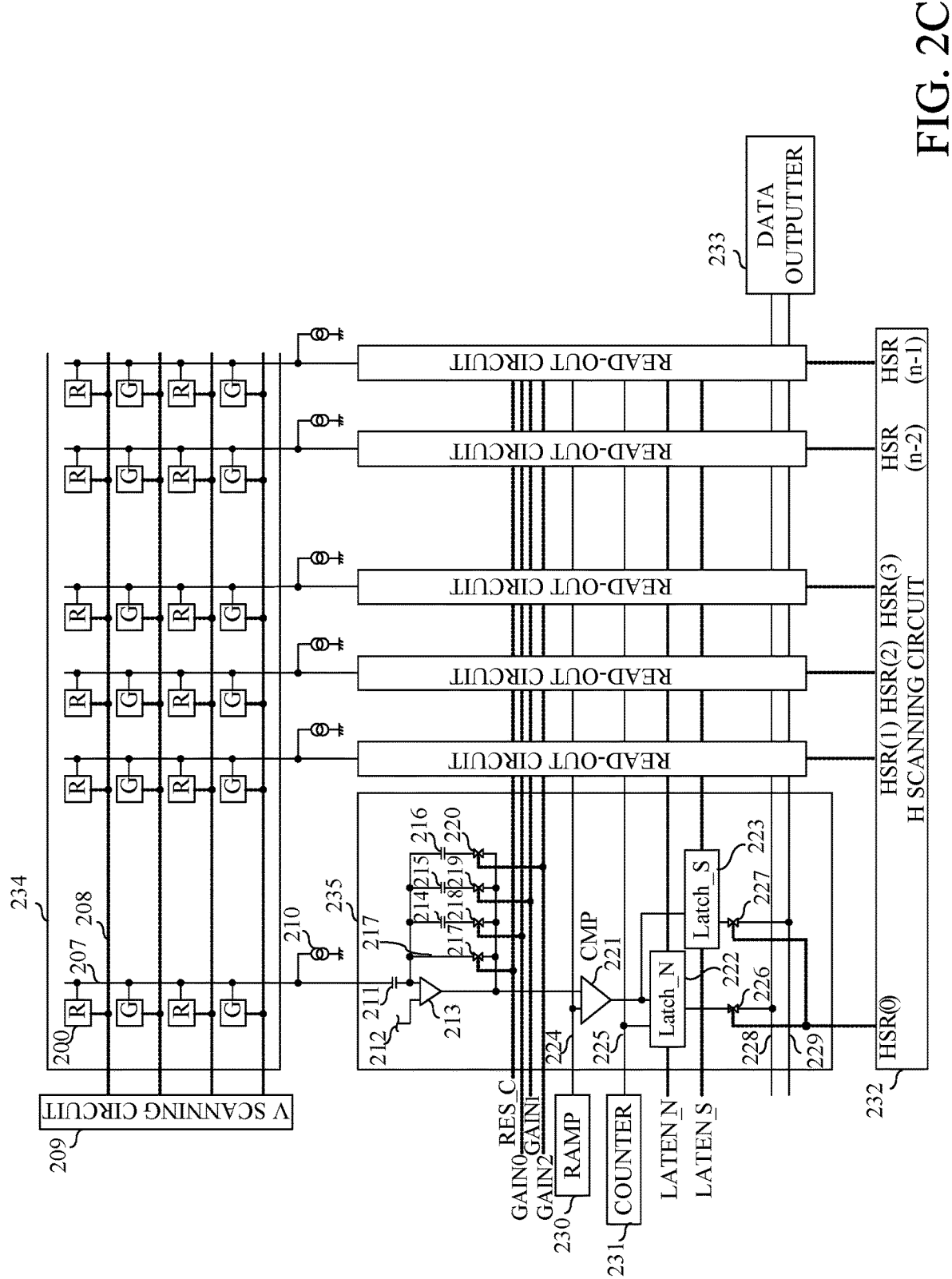

Next, description will be made of a structure of the image sensor 14 with reference to FIGS. 2A to 2C. FIG. 2A illustrates a structure of one pixel 200 of the image sensor 14. The pixel 200 includes two photodiodes (PD) 201*a* and 201*b* that are paired photoelectric convertors, transfer switches 202*a* and 202*b*, a floating diffusion area 203, an amplifier 204, a reset switch 205 and a selection switch 206. Each switch is constituted by a MOS transistor or the like. In the following description, as an example, each switch is constituted by an N-type MOS transistor. However, each switch may be constituted by a P-type MOS transistor or any one of other switching elements. Furthermore, the number of photodiodes included in the pixel 200 may be three or more (for example, four).

The photodiodes 201*a* and 201*b* each receive light passing through a common microlens 201*c* to photoelectrically convert the light into electrical charges corresponding to an amount of the received light. In the following description, a signal obtained from the electrical charges generated by the photodiode 201*a* is referred to as an A signal, and a signal obtained from the electrical charges generated by the photodiode 201*b* is referred to as a B signal.

The transfer switch 202*a* is connected between the photodiode 201*a* and the floating diffusion area 203, and the transfer switch 202*b* is connected between the photodiode 201*b* and the floating diffusion area 203. The transfer switches 202a and 202b respectively transfer the electrical charges generated by the photodiodes 201a and 201b to the common floating diffusion area 203. The transfer switches 202a and 202b are respectively controlled by control signals TX_A and TX_B.

The floating diffusion area 203 temporarily holds the electrical charges transferred from the photodiodes 201a and 201b, and converts the held electrical charges into voltage signals. The amplifier 204 is constituted by a source follower MOS transistor 204. The amplifier 204 has a gate connected to the floating diffusion area 203, and has a drain connected to a common power source 208 that supplies a power source potential VDD. The amplifier 204 amplifies the voltage signal obtained from the electrical charges held by the floating diffusion area 203 to output the amplified voltage signal.

The reset switch 205 is connected between the floating diffusion area 203 and the common power source 208. The reset switch 205 is controlled by a control signal RES to reset a potential in the floating diffusion area 203 to the power source potential VDD.

The selection switch 206 is connected between a source of the amplifier 204 and a vertical output line 207. The selection switch 206 is controlled by a control signal SEL to output the amplified voltage signal to the vertical output line 207.

FIG. 2C illustrates a circuit configuration of the image sensor 14. The image sensor 14 includes a pixel array 234, a vertical scanning circuit 209, a current source load 210, read-out circuits 235, common output lines 228 and 229, a horizontal scanning circuit 232 and a data outputter 233.

The pixel array 234 includes multiple pixels 200 arranged in matrix. FIG. 2C simply illustrates horizontal n×vertical four pixels of all the pixels 200. Each pixel 200 is provided with one of color filters of multiple colors. FIG. 2C exemplary illustrates color filters of red (R), green (G) and blue (B). All the pixels (n rows×m columns) 200 provided with these color filters are arranged in a Bayer arrangement.

The image sensor 14 further has an area (OB) in which a part of the pixel array 234 is shielded by a light-shielding layer.

The vertical scanning line 209 outputs control signals, through drive signal lines 208 provided for the respective pixel rows, to the pixels 200 in the respective pixel rows. Although FIG. 2C illustrates one drive signal line 208 for each pixel row, multiple drive signal lines are provided for each pixel row in reality.

The pixels 200 in the same pixel row are commonly connected to the vertical output line 207 provided for each pixel row. An output signal from each pixel 200 is input to the read-out circuit 235 through the vertical output line 207, and is processed by the read-out circuit 235. The current source load 210 is connected to the vertical output lines 207 for the respective pixel rows.

The horizontal scanning circuit 232 sequentially outputs control signals HSR(0) to HRS(n−1) to sequentially select, out of the multiple read-out circuits 235, one read-out circuit 235 from which the output signal is output. The selected read-out circuit 235 outputs a processed output signal to an output amplifier 233 through the common output lines 228 and 229.

Description will be made of a specific configuration of the read-out circuit 235. The read-out circuit 235 includes a clamp capacitor 211, feedback capacitors 214 to 216, and an operational amplifier 213, a reference voltage source 212 and switches 217 to 220. The read-out circuit 235 further includes a comparator 221, a Latch_N 222, a Latch_S 223 and switches 226 and 227.

The output signal input to the read-out circuit 235 through the vertical output line 207 is input to an inverting input terminal of the operational amplifier 213 through the clamp capacitor 211. A non-inverting input terminal of the operational amplifier 213 receives a reference voltage Vref supplied from the reference voltage source 212. The feedback capacitors 214 to 216 are connected between the inverting input terminal and an output terminal of the operational amplifier 213. The switch 217 is also connected between the inverting input terminal and an output terminal of the operational amplifier 213 to short both ends of the feedback capacitors 214 to 216. The switch 217 is controlled by a control signal RES_C. The switches 218 to 220 are respectively controlled by control signals GAIN0 to GAIN2.

The comparator 221 is connected to the output terminal of the operational amplifier 213 and an output terminal of a ramp signal generator 230 that outputs a ramp signal 224. The Latch_N 222 is a storage element for holding a noise level (N signal). The Latch_S 223 is a storage element for holding levels (S signal) of the A signal and an AB signal produced by adding the A signal and the B signal. An output signal from the output terminal of the comparator 221 and a count value 225 output from a counter 231 are input to each of the Latch_N 222 and the Latch_S 223. The Latch_N 222 and the Latch_S are respectively controlled by control signals LATEN_N and LATEN_S. Output terminals of the Latch_N 222 and the Latch_S are respectively connected to the common output lines 228 and 229 through the switches 226 and 227. The common output lines 228 and 229 are connected to the data outputter 233.

The switches 226 and 227 are controlled by the control signal HSR(h) from the horizontal scanning circuit 232. The symbol h represents a column number of the read-out circuit 235 to which a control signal line is connected. The signals held by the Latch_N 222 and the Latch_S are output to the data outputter 233 respectively through the common output lines 228 and 239, and then output from the data outputter 233 to an outside.

In this embodiment, the image sensor 14 has a first read-out mode and a second read-out mode. In the first read-out mode, an all pixel read-out is performed in which the output signals from all the pixels 200 of the image sensor 14 are read out so as to capture a high-definition recording still image. In the second read-out mode, a decimation read-out is performed in which the output signals from a part of all the pixels 200 are read out so as to display a live-view image and a recording moving image each whose number of pixels is less than that of the recording still image. Since the number of pixels required for producing the live-view image and the recording moving image is less than a whole pixel number, reading out the output signals from the pixels whose number is horizontally and vertically decimated at a predetermined ratio from all the pixels of the image sensor 14 reduces a signal processing load and contributes reduction of power consumption. In both the first and second read-out modes, the output signals from the paired photoelectric convertors in each pixel can be individually read out, so that the paired phase difference image signals can be produced.

FIGS. 3A and 3B illustrate a conjugate relation between, in the camera system of this embodiment, an exit pupil (exit pupil plane) of the image-capturing optical system and the paired photoelectric convertors 201a and 201b of a pixel (hereinafter referred to as a center pixel) 200 disposed near an image height of 0 in the image sensor 14, that is, near a center of an image plane. The exit pupil plane of the image-capturing optical system and the paired photoelectric convertors 201a and 201b are arranged in conjugate relation by the micro lens 201c. The exit pupil of the image-capturing optical system is located in a plane at which the aperture stop 312 is disposed.

The image-capturing optical system of this embodiment has a zooming function, and thus an exit pupil distance from the image plane to the exit pupil is changed with zooming. The image-capturing optical system illustrated in FIG. 3A is in an intermediate zoom state where its focal length is an intermediate length between a wide-angle end and a telephoto end. With this intermediate length being defined as a standard exit pupil distance Zep, an eccentric parameter depending on a shape of the micro lens 201c and an image height (X and Y coordinates) is optimized.

In FIG. 3A, reference numeral 301 denotes a first lens unit disposed at a most object side position in the image-capturing optical system, and reference numeral 301b denotes a lens barrel member that holds the first lens unit 301. Reference numeral 311b denotes a lens barrel member that holds the focus lens 311. Reference numeral 312a denotes an aperture plate that has an aperture for defining a full-open aperture diameter of the aperture stop 312, and reference numeral 312b denotes a stop blade that changes a narrowed aperture diameter of the aperture stop 312. In FIG. 3A, the lens barrel member 301b, the aperture plate 312a and the stop blade 312b, which are members that restrict the light flux passing through the image-capturing optical system, are illustrated as optical virtual images viewed from the image plane. A synthetic aperture near the aperture stop 312 is defined as the exit pupil of the image-capturing optical system (hereinafter referred to as "a lens exit pupil"). As described above, the distance from the image plane to the lens exit pupil is represented by Zep.

The paired photoelectric convertors 201a and 201b included in the center pixel 200 is reversely projected as images EP1a and EP1b on the lens exit pupil by the microlens 201c. In other words, mutually different pupil areas (hereinafter referred to as "focus detection pupils) EP1a and EP1b in the lens exit pupil is projected onto surfaces of the paired photoelectric convertors 201a and 201b through the microlens 201c. The center pixel 200 includes, in order from its lowest layer, the photoelectric convertors 201a and 201b, wiring layers 201e to 201g, a color filter 201h and the microlens 201c.

FIG. 3B illustrates reversely-projected images EP1a and EP1b of the photoelectric convertors 201a and 201b on the exit pupil plane of the image-capturing optical system, which are viewed from the optical axis direction. The image sensor 14 includes pixels capable of outputting the output signal from one of the paired photoelectric convertors 201a and 201b and of adding together the output signals from the paired photoelectric convertors 201a and 201b to output the added output signal. The added output signal is a signal obtained by photoelectrically converting a whole light flux passing through the focus detection pupils EP1a and EP1b.

In FIG. 3A, a light flux (its outer edge is illustrated by straight lines) L passing through the image-capturing optical system is restricted by the aperture plate 312a of the aperture stop 312. Light fluxes (phase difference images) CLa and CLb from the focus detection pupils EP1a and EP1b reach the center pixel 200 without being blocked. FIG. 3B illustrates a section (outer edge) of the light flux L illustrated in FIG. 3A at the exit pupil plane. Most parts of the reversely-projected images EP1a and EP1b of the paired photoelectric convertors 201a and 201b are included inside a circular aperture TL of the aperture plate 312a, so that the reversely-projected images EP1a and EP1b each include only a small lack (vignetting). The lacks of the reversely-projected images EP1a and EP1b are symmetry with respect to the optical axis (illustrated by a dashed-dotted line) of the image-capturing optical system, so that amounts of light received by the paired photoelectric convertors 201a and 201b are equal to each other.

As described above, the image sensor 14 has not only the function of capturing the object image, but also the function of individually receiving the light fluxes from the mutually different focus detection pupils in the lens exit pupil to perform the focus detection by the imaging-surface phase difference detection method. Although this embodiment describes the case where each pixel of the image sensor 14 includes the paired photoelectric convertors, the paired photoelectric convertors may be two focus detection pixels whose mutually different parts are light-shielded.

FIG. 4 illustrates focus detection areas 401 in an image-capturing frame 400.

In this embodiment, the focus detection by the imaging-surface phase difference detection method is performed at multiple (three) focus detection areas 401.

In each focus detection area 401, a phase difference is detected using a horizontal contrast difference.

Figure 5:
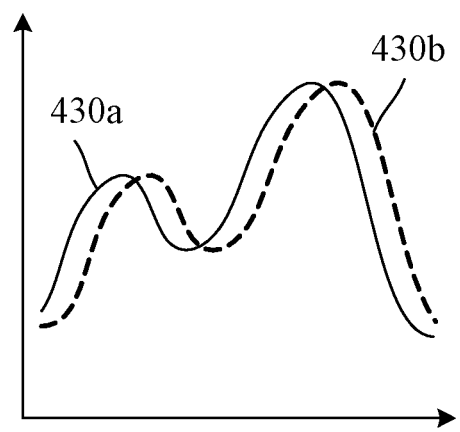
FIG. 5 illustrates paired focus detection signals obtained in the focus detection area in Embodiment 1.

FIG. 5 exemplary illustrates paired phase difference image signals 430a and 430b. The paired phase difference image signals 430a and 430b are produced respectively by combining together the A signals and by combining together the B signals, the A and B signals being obtained from the pixels in the focus detection area 401 of the image sensor 14, and are subjected to various image processes (corrections) performed by the image processor 20. The paired phase difference image signals 430a and 430b are sent to the AF calculator 42.

In FIG. 5, a horizontal axis indicates a pixel arrangement direction in which the A or B signals are combined together, and a vertical axis indicates an intensity of the signal. FIG. 5 illustrates the paired phase difference image signals 430a and 430b in a defocus state (out-of-focus state) where the image-capturing optical system is out of focus for the object. As compared with an in-focus state, the phase difference image signal 430a is shifted leftward, and the phase difference image signal 430b is shifted rightward. The AF calculator 42 performs a correlation calculation on the paired phase difference image signals 430a and 430b to calculate a shift amount (phase difference) therebetween, and calculates, using the phase difference, a defocus amount of the image-capturing optical system for the object.

The system controller 50 calculates a drive amount of the focus lens 311 using information on a focus sensitivity (indicating an image plane movement amount for a unit movement amount of the focus lens 311) received from the lens controller 346 and the defocus amount received from the AF calculator 42. The system controller 50 further calculates, using information on the position of the focus lens 311 received from the lens controller 346 and the calculated drive amount of the focus lens 311, a target position to which the focus lens 311 is moved, and sends the target position to the lens controller 346. The lens controller 346 moves the focus lens 311 to the target position through the focus controller 342.

Thus, the focusing is performed by the imaging-surface phase difference AF.

Figure 6:
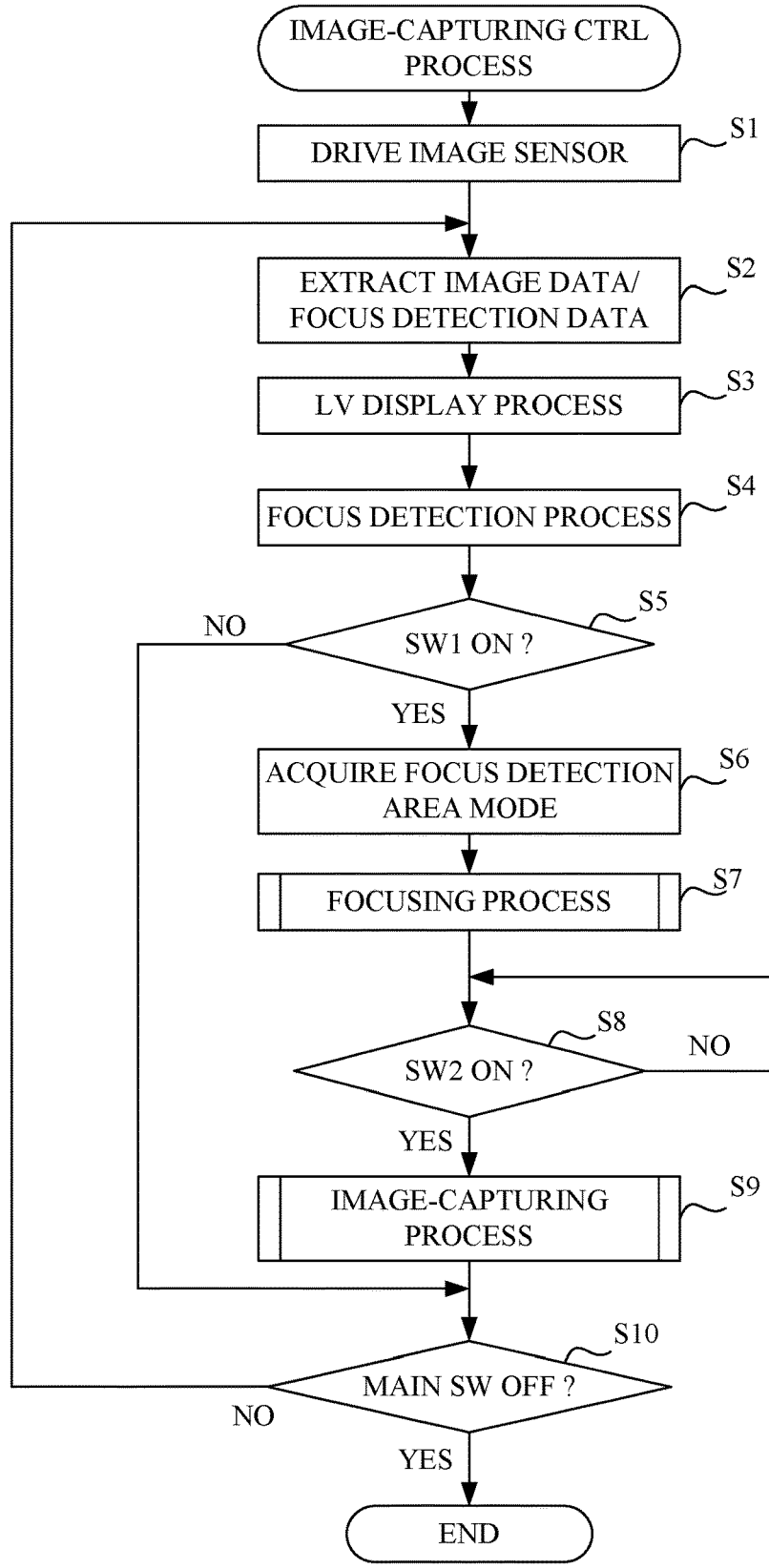
FIG. 6 illustrates a flowchart of an image-capturing control process performed in Embodiment 1.

Next, with reference to a flowchart of FIG. 6, description will be made of an image-capturing control process (control method) in the camera 100 of this embodiment. FIG. 6 illustrates the image-capturing control process in a case of performing from a state where the live-view image is displayed to a state where the still image capturing is performed. The system controller 50 as a computer executes this process according to a control program as a computer program. The symbol "S" in the following description represents a step.

First, at S1, the system controller 50 causes the image sensor 14 to perform image capturing for producing the live-view image and to input the image-capturing signal to the image processor 20.

Next, at S2, the system controller 50 causes the image processor 20 to produce, from the image-capturing signal, live-view image data and focus detection data.

Next, at S3, the system controller 50 causes the image display unit 28 to display the live-view image corresponding to the live-view image data produced at S2.

The user observing the displayed live-view image can decide an image-capturing composition. The display of the live-view image, which is used for user's conformation of the image-capturing frame and the image-capturing conditions, is updated at predetermined intervals such as 33.3 ms (30 fps) or 16.6 ms (60 fps).

The system controller 50 may stop the display of the live-view image on the image display unit 28 when the AF assist light is emitted. For example, when the above described flash assist light is emitted, a partial area of the object in the live-view image may be saturated in luminance and thereby the live-view image may be degraded. Therefore, when the AF assist light is emitted, it is desirable to stop the display of the live-view image and to restart it thereafter. On the other hand, the LED assist light can be continuously emitted, so that the live-view image can be kept in a proper exposure state. Therefore, it is not necessary to stop the display of the live-view image. Even when the flash assist light is emitted, as long as the luminance-saturated area or an amount of the flash light is small, the display of the live-view image may be maintained.

Next, at S4, the system controller 50 (AF calculator 42) performs a focus detection process using the focus detection data obtained from the three focus detection areas 401 illustrated in FIG. 4. That is, the AF calculator 42 performs the focus detection process that calculates the phase difference between the paired phase difference image signals illustrated in FIG. 5 and calculates the defocus amount from the phase difference.

Next, at S5, the system controller 50 detects ON or OFF of the switch SW1 as an image-capturing preparation instructing switch. The switch SW1 is turned on by a user's half-press operation of a release (image-capturing trigger) switch included in the operation unit 70. If the switch SW1 is ON, the system controller 50 proceeds to S6. If the switch SW1 is OFF, the system controller 50 proceeds to S10.

At S10, the system controller 50 determines whether a main (power) switch is turned off. If the main switch is not turned off, the system controller 50 returns to S2. If the main switch is turned off, the system controller 50 ends this process.

At S6, the system controller 50 acquires a focus detection area mode.

As the focus detection area mode, the camera 100 has a user selection mode, an automatic selection mode and an object detection mode. The user selection mode is a mode that sets one or more focus detection areas according to user's selection. The automatic selection mode is a mode in which the system controller 50 selects one or more focus detection areas. The object detection mode is a mode in which the system controller 50 detects a specific object such as a person's face to set one or more focus detection areas including the specific object. At S6, the system controller 50 further acquires information on a preset focus detection area mode and object detection information indicating the above specific object to set the number of focus detection areas (one or more), and position(s) and an arrangement thereof.

Next, at S7, the system controller 50 (AF calculator 42) performs a focusing process at the focus detection area 401 set according to the focus detection area mode acquired at S6. The focusing process will be described in detail. After the focusing process at S7, the system controller 50 proceeds to S8.

At S8, the system controller 50 detects ON or OFF of the switch SW2 as an image-capturing starting switch. The switch SW2 is turned on by a user's full-press operation of the release switch. If the switch SW2 is OFF, the system controller 50 waits for ON of SW2. If the switch SW2 is ON, the system controller 50 proceeds to S9.

At S9, the system controller 50 performs an image-capturing process. The image-capturing process will be described in detail. After the image-capturing process at S9, the system controller 50 proceeds to S10.

Next, with reference to a flowchart of FIG. 7, description will be made of the focusing process performed at S7 in FIG. 6. The system controller 50 having started the focusing process acquires at S201 the defocus amount as a result of the focus detection performed at S4. The system controller 50 further determines whether the acquired defocus amount has a high reliability.

If the defocus amount has a high reliability, the system controller 50 proceeds to S202.

The system controller 50 determines the reliability by using a local minimal value of a correlation amount between the paired phase difference image signals and a difference amount of the correlation amounts obtained near the shift amount at which the correlation amount becomes the local minimal value in the correlation calculation.

The correlation amount indicates a correlation degree between the paired phase difference image signals. A smaller correlation amount indicates a higher correlation.

In other words, as the local minimal value of the correlation amount becomes smaller, the reliability becomes higher. The system controller 50 determines that, if the local minimal value of the correlation amount is smaller than a threshold Thr1, the reliability is high. The local minimal value of the correlation amount ideally becomes 0 when shapes of the paired phase difference image signals are completely identical to each other. However, actual paired phase difference image signals have mutually different shapes due to influences of a diffusion characteristic of light from the object, a light amount control error and a noise generated in each pixel. Therefore, the local minimal value of the correlation amount is typically a positive value. On the other hand, as a difference between the shapes of the paired phase difference image signals increases, a detection accuracy of the local minimal value becomes lower, which results in decrease in accuracy of the focus detection.

As the difference amount of the correlation amounts obtained near the shift amount at which the correlation amount becomes the local minimal value becomes larger, the shift amount can be more accurately calculated. The reason for this is that a larger difference of the correlation amounts reduces an influence of variation of the correlation amount due to errors on the detection of the shift amount. Thus, the system controller 50 determines that, if the difference amount of the correlation amounts is larger than a threshold Thr2, the reliability is high (that is, the reliability is a first reliability).

At S202, the system controller 50 determines whether a defocus amount whose reliability is high has been detected in each focus detection area set according to the focus detection area mode acquired at S6. If the defocus amount whose reliability is high has been detected in each set focus detection area, the system controller 50 proceeds to S203. The reason for proceeding from S202 to S203 only when the defocus amount whose reliability is high has been detected in each set focus detection area is that the reliability may become high in any of the focus detection areas due to emission of the AF assist light. The system controller 50 attempts the focus detection using the AF assist light when the reliability is low in any set focus detection area. However, when the number of focus detection areas is large, it is unnecessary to use no AF assist light only when the reliability in each set focus detection area is high. For example, a determination of using no AF assist light may be made when the reliability is high only in the focus detection area whose image height is near 0.

At S203, the system controller 50 determines whether the defocus amount detected in the focus detection area set at S6 indicates an in-focus state where the detected defocus amount is equal to or less than a predetermined defocus amount or a defocus state where the detected defocus amount is larger than the predetermined defocus amount. At this step, the system controller 50 selects, among the focus detection areas set according to the focus detection area mode, one focus detection area according to a predetermined algorithm such as a close priority algorithm and a center priority algorithm, and compares the defocus amount detected in the selected focus detection area with the predetermined defocus amount. The system controller 50 having determined that the detected defocus amount indicates the defocus state proceeds to S204 to drive the focus lens 311 depending on the detected defocus amount.

On the other hand, the system controller 50 having determined at S203 that the detected defocus amount indicates the in-focus state proceeds to S205 to cause the image display unit 28 to perform an in-focus display indicating the in-focus state. For example, the image display unit 28 displays a specific color frame indicating the focus detection area where the in-focus state is obtained, or outputs a sound indicating that the in-focus state is obtained.

The system controller 50 having determined at S202 that the defocus amount whose reliability is high has not been detected proceeds to S206 to perform a process to determine a necessity of emission of the AF assist light. This AF assist light necessity determination process will be described later in detail.

Next, at S205, the system controller 50 determines whether a result of the determination process at S206 indicates that the AF assist light (that is, the LED assist light or the flash assist light) is necessary. If the AF assist light is not necessary, the system controller 50 proceeds to S208.

At S208, the system controller 50 performs a focus detection process (second focus detection process) with the focus lens 311 being moved, that is, with a search drive of the focus lens 311. The focus detection process performed herein is the same as the focus detection process performed at S4. The system controller 50 having determined at S209, as a result of the focus detection with the search drive at S208, that the focus detection can be performed proceeds to S203.

On the other hand, the system controller 50 having determined at S209 that the focus detection still cannot be performed proceeds to S210 to determine whether the focus lens 311 is located at its movable end (that is, at the telephoto end or the wide-angle end) in the optical axis direction. If the focus lens 311 does not reach the movable end, the system controller 50 returns to S208 to continue the focus detection with the search drive.

If the focus lens 311 has reached the movable end at S210, the system controller 50 regards an object on which the image-capturing lens 300 can be in focus as being not located at a position at which an in-focus state is obtained in a movable range of the focus lens 311 to proceed to S211.

At S211, the system controller 50 stops the focus detection, and causes the image display unit 28 to perform an out-of-focus display indicating that an in-focus state cannot be obtained.

The system controller 50 having determined at S207 that the AF assist light is necessary proceeds to S212 to calculate an initial position of the focus lens 311 (hereinafter referred to as "a focus initial position"). Specifically, the system controller 50 acquires focus detection information described later, and calculates a detectable defocus amount that is an estimated defocus amount detectable using the focus detection information. The system controller 50 further calculates, from the detectable defocus amount and information on an object distance at the close end of the image-capturing lens 300, the focus initial position that can cover an object distance range as wide as possible including the close end (that can widen a defocus range where the defocus amount whose reliability is high can be calculated).

Figures 8, 9:
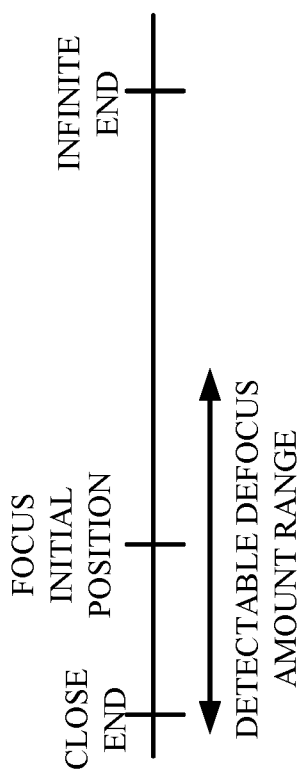
FIG. 8 illustrates a detectable defocus amount range in Embodiment 1.
FIG. 9 illustrates a table of detectable defocus amounts in Embodiment 1.

FIG. 8 illustrates the focus initial position. In FIG. 8, a horizontal axis indicates focus positions corresponding to in-focus object distances. FIG. 8 further illustrates a range of the calculated detectable defocus amount (hereinafter referred to as "a defocus amount detectable range") by an arrow. The focus initial position is set in the defocus amount detectable range including the close end that is the movable end of the focus lens 311 such that the defocus amount detectable range extends toward a far distance side from the close end.

The reason for setting the focus initial position in the defocus amount detectable range including the close end is that the object distance at which the AF assist light reaches and thereby the focus detection is enabled is a close distance. Therefore, the focus initial position is not limited to the close end, and can be calculated depending on a preset object distance at which an object is likely to be located, such as a distance corresponding to a constant multiple of the focus length or 1 m. Setting the object distance such as the distance corresponding to the constant multiple of the focus length or 1 m, which is not the close end, generates a case where the focus detection cannot be performed on a closer object. In this case, however, a far distance side object distance range may be set to a range where the focus detection can be made.

Furthermore, a method may be employed which sets a flash assist light reaching distance where the flash assist light as the AF assist light reaches and sets the focus initial position in a range whose far distance side end corresponds to the flash assist light reaching distance. Thereby, it is possible to limit the object distance at which the focus detection can be performed, so that a more proper focus initial position having a margin can be set.

The focus detection information is information on the focus detection for roughly calculating the detectable defocus amount, and is information on at least one of an F-number of the image-capturing lens 300, the above-described frame information, an image height of the focus detection area and a contrast of the phase difference image signal. Using the F-number of the image-capturing lens 300, the frame information and the image height of the focus detection area enables calculating a base length between the paired photoelectric convertors that perform the focus detection (that is, a distance between centroids of the focus detection pupils) and an AF light flux diameter (a range through which the light flux forming the phase difference image passes in the focus detection pupil). As the base length becomes longer, a shift amount between the paired phase difference image signals per a unit defocus amount becomes larger, so that the focus detection can be performed with a higher accuracy. As the AF light flux diameter becomes smaller, the phase difference image signal becomes less likely to be blurred, so that the shift amount between the paired phase difference image signals can be detected even in a state where the defocus amount is large. As the AF light flux diameter increases, the base length becomes longer.

Moreover, the detectable defocus amount changes depending on an object's contrast, an object's spatial frequency characteristic and others. For an object having more information of a higher spatial frequency and having a higher contrast, the focus detection can be made in a state where the defocus amount is larger. As information on the object's contrast, for example, a sum of squares of differences between mutually adjacent pixel signals in the phase difference image signal may be used.

The system controller 50 stores a data table including data of the detectable defocus amounts corresponding to the above-described focus detection information. FIG. 9 illustrates the data table of the detectable defocus amounts. As described above, the system controller 50 calculates, as the focus detection information, the AF light flux diameter and the object's contrast, and acquires the detectable defocus amount from the data table illustrated in FIG. 9.

The flash assist light reaching distance may be also changed depending on the AF light flux diameter. As the AF light flux diameter decreases, the flash assist light reaching distance becomes shorter. This enables setting a more proper focus initial position.

The system controller 50 having calculated the focus initial position at S212 proceeds to S213 to move the focus lens 311 to the calculated focus initial position.

Next, at S214, the system controller 50 determines whether only emission of the LED assist light is allowed. In this embodiment, the system controller 50 controls the flash unit 48 and the LED lamp 49, which are the light emitters each emitting the AF assist light. If only the emission of the LED assist light is allowed (that is, emission of the flash assist light is prohibited), the system controller 50 proceeds to S215 to perform a focusing process with only the LED assist light being emitted from the LED lamp 49. This focusing process with only the LED assist light is hereinafter referred to as "an LED focusing process". On the other hand, if the emission of the flash assist light is allowed, the system controller 50 proceeds to S216 to perform a focusing process with the LED assist light or the flash assist light being emitted from the LED lamp 49 or the flash unit 48. This focusing process with the LED or flash assist light is hereinafter referred to as "an LED/flash focusing process". These focusing processes will be described later in detail. The system controller 50 having finished the LED focusing process at S215 or the LED/flash focusing process at S216 ends the focusing process.

Figure 10:
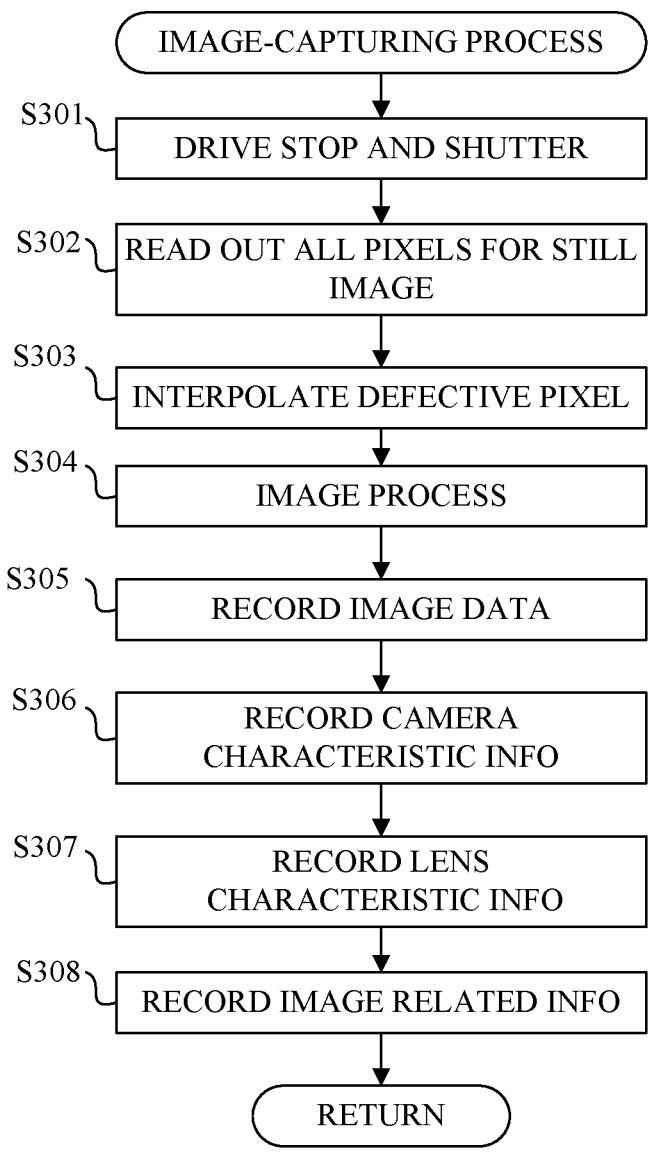
FIG. 10 illustrates a flowchart of an image-capturing process performed in Embodiment 1.

Next, with reference to a flowchart of FIG. 10, description will be made of the image-capturing process performed at S9 in FIG. 6. First, at S301, the system controller 50 drives the aperture stop 312 for light amount control and drives the shutter 12 for exposure time control. When performing image capturing with the flash light being emitted from the flash unit 48, the system controller 50 drives the shutter 12 in synchronization with that flash light emission.

Next, at S302, the system controller 50 performs the all pixel read-out for still image capturing.

Next, at S303, the system controller 50 (image processor 20) performs a defective pixel interpolation process on the image-capturing signal read out from the image sensor 14. The defective pixel interpolation process is performed using prestored information on positions of defective pixels. The defective pixel includes a pixel whose output offset or gain is significantly different from that of other pixels and a pixel that is not used for image capturing (for example, the above-described focus detection pixel).

Next, at S604, the system controller 50 performs, on the image-capturing signal, image processes such as γ-correction, color conversion and edge enhancement to produce captured image data (still image data). Then, at S305, the system controller 50 records the captured image data to the memory 30.

Next, at S306, the system controller 50 records characteristic information of the camera 100 in correspondence with the captured image data recorded at S305 to a memory in the system controller 50. The characteristic information of the camera 100 includes information on, for example, an exposure time, an image development process, a light-receiving sensitivity of the pixel of the image sensor 14 and vignetting of an image-capturing light flux in the camera 100. The light-receiving sensitivity of the pixel depends on the microlens 201c and the photodiodes 201a and 201b, so that information on their structures (such as a size or a pitch of the photodiodes 201a and 201b and a distance from the microlens 201c to the photodiodes 201a and 201b) may be recorded as the characteristic information of the camera 100. The characteristic information of the camera 100 further includes information on a distance from a mount surface between the camera 100 and the image-capturing lens 300 to the image sensor 14 and information on manufacturing errors.

Next, at S307, the system controller 50 records characteristic information of the image-capturing lens 300 in correspondence with the captured image data recorded at S305 to the memory 30 in the camera 100 and the memory in the system controller 50. The characteristic information of the image-capturing lens 300 includes information on, for example, the exit pupil, the frames (frame information), the focal length and F-number in image capturing, aberrations of the image-capturing optical system and manufacturing errors.

Next, at S308, the system controller 50 records image related information to the memory 30 in the camera 100 and the memory in the system controller 50. The image related information is information on the captured image data and includes information on, for example, a focus detection operation before image capturing, object's movement and accuracy of the focus detection operation. The system controller having finished the process at S307 proceeds to S10 in FIG. 6.

Figure 11:
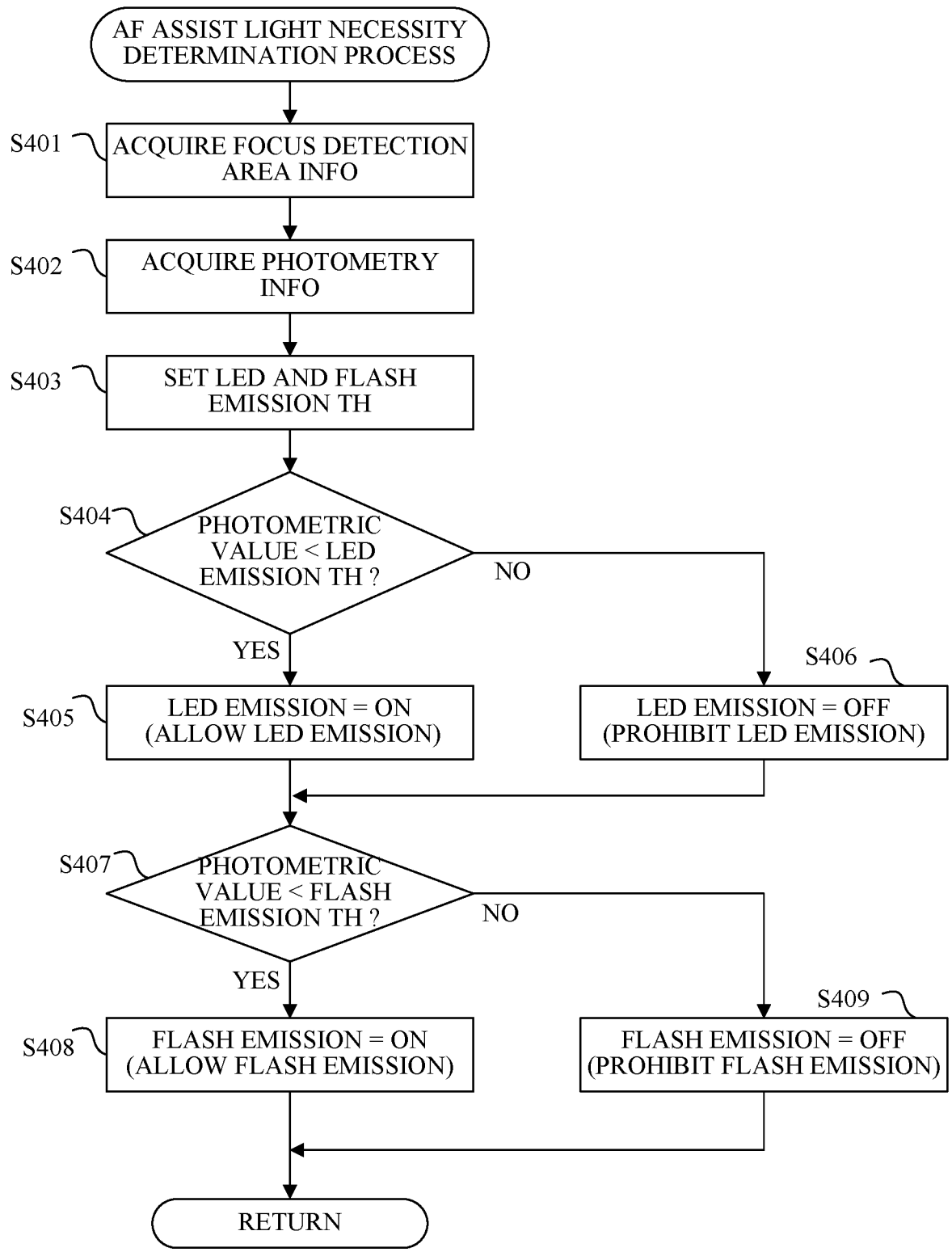
FIG. 11 illustrates a flowchart of an AF assist light necessity determination process performed in Embodiment 1.

Next, with reference to a flowchart of FIG. 11, description will be made of the AF assist light necessity determination process performed at S206 in FIG. 7. At S401, the system controller 50 acquires information on the focus detection area. The information on the focus detection area is information on, for example, the number, position(s) and arrangement of the focus detection area(s) set according to the focus detection area mode at S6 in FIG. 6.

Next, at S402, the system controller 50 acquires photometry information. The photometry information includes a photometric value in each focus detection area and a photometric value in an area including all the focus detection area (s).

Next, at S403, the system controller 50 sets a threshold (hereinafter referred to as "an LED emission threshold") for determining the emission of the LED assist light and a threshold (hereinafter referred to as "a flash light emission threshold") for determining the emission of the flash assist light. The LED assist light is emitted to a narrow area in the image-capturing area, but can be continuously emitted, which makes the focus detection with the AF assist light easy. On the other hand, the flash assist light is emitted to a wide area, but is intermittently emitted. Therefore, a large number of its emissions makes it impossible to provide a required light emission amount for recording image capturing. Thus, at S403, the system controller 50 sets the LED and flash light emission thresholds so as to prioritize the emission of the LED assist light over the emission of the flash assist light. However, with consideration of a focus detection error when the LED assist light is a monochromatic light such as a red light and of vignetting of the LED assist light by the image-capturing lens 300 when the LED lamp 49 is disposed near the image-capturing lens 300, the system controller 50 may set the LED and flash light emission thresholds so as to prioritize the emission of the flash assist light over the emission of the LED assist light.

Next, at S404, the system controller 50 compares the photometric value indicated by the photometry information acquired at S402 with the LED emission threshold set at S403. The photometric value compared with the LED emission threshold includes the photometric value in the area including all the focus detection area(s) and the photometric value in each focus detection area. When any one of the photometric values is lower than the LED emission threshold, the system controller 50 proceeds to S405 to determine that the LED emission is ON (that is, to allow the emission of the LED assist light). On the other hand, when any one of the photometric values is equal to or higher than the LED emission threshold, the system controller 50 proceeds to S406 to determine that the LED emission is OFF (that is, to prohibit the emission of the LED assist light).

Next, at S407, the system controller 50 compares the photometric value acquired at S402 with the flash light emission threshold set at S403. The photometric value compared with the flash light emission threshold also includes the photometric value in the area including all the focus detection area(s) and the photometric value in each focus detection area. When any one of the photometric values is lower than the flash light emission threshold, the system controller 50 proceeds to S408 to determine that the flash light emission is ON (that is, to allow the emission of the flash assist light). On the other hand, when any one of the photometric values is equal to or higher than the flash light emission threshold, the system controller 50 proceeds to S409 to determine that the flash light emission is OFF (that is, to prohibit the emission of the flash assist light). The system controller 50 having finished the process at S408 or S409 ends the AF assist light necessity determination process.

Figure 12:
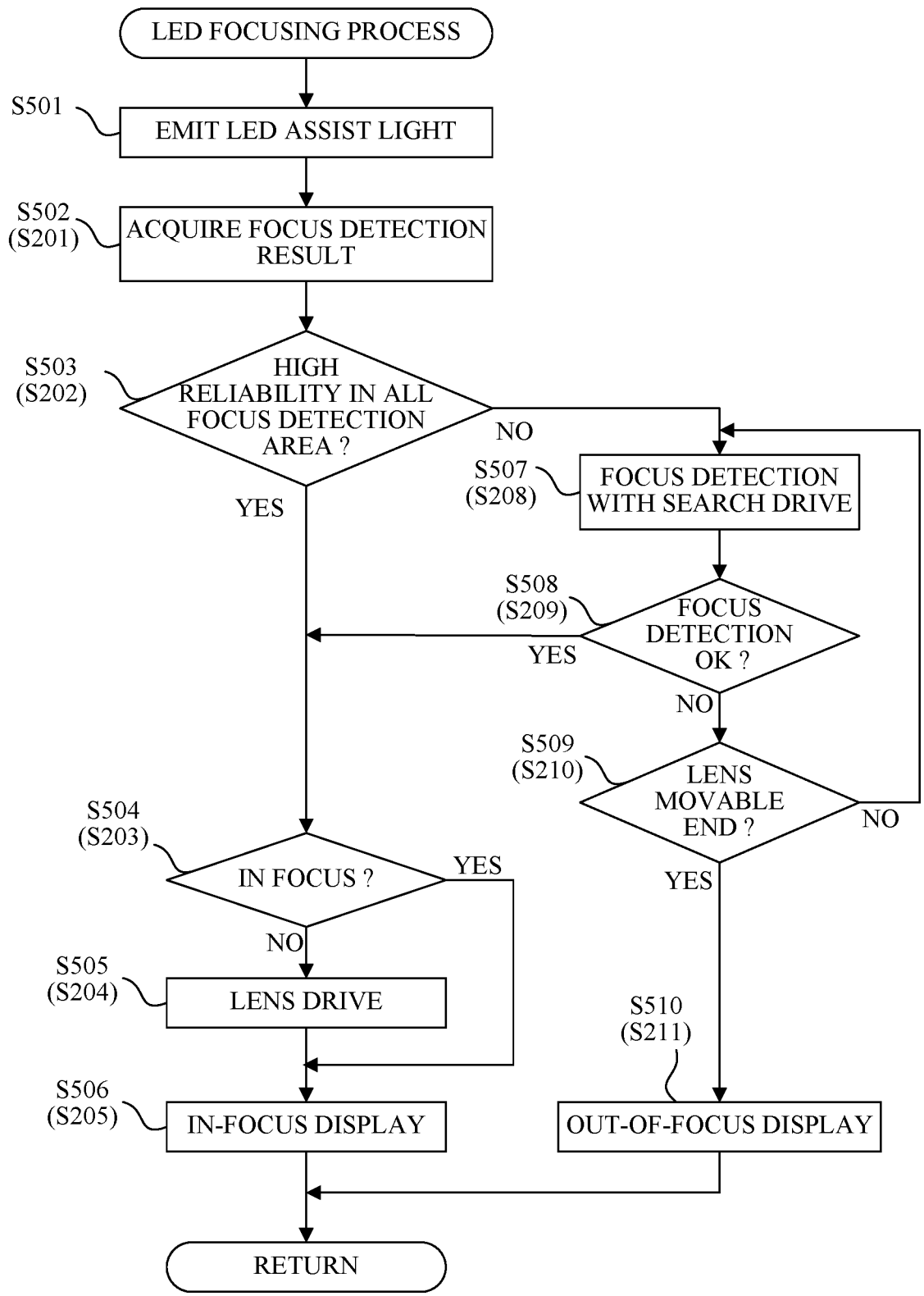
FIG. 12 illustrates a flowchart of an LED focusing process performed in Embodiment 1.

Next, with reference to a flowchart of FIG. 12, description will be made of the LED focusing process performed at S215 in FIG. 7. At S501, the system controller 50 causes the LED lamp 48 to emit the LED assist light and to continue the emission of the LED assist light at least until the in-focus state is obtained at S504 described later.

Figure 7:
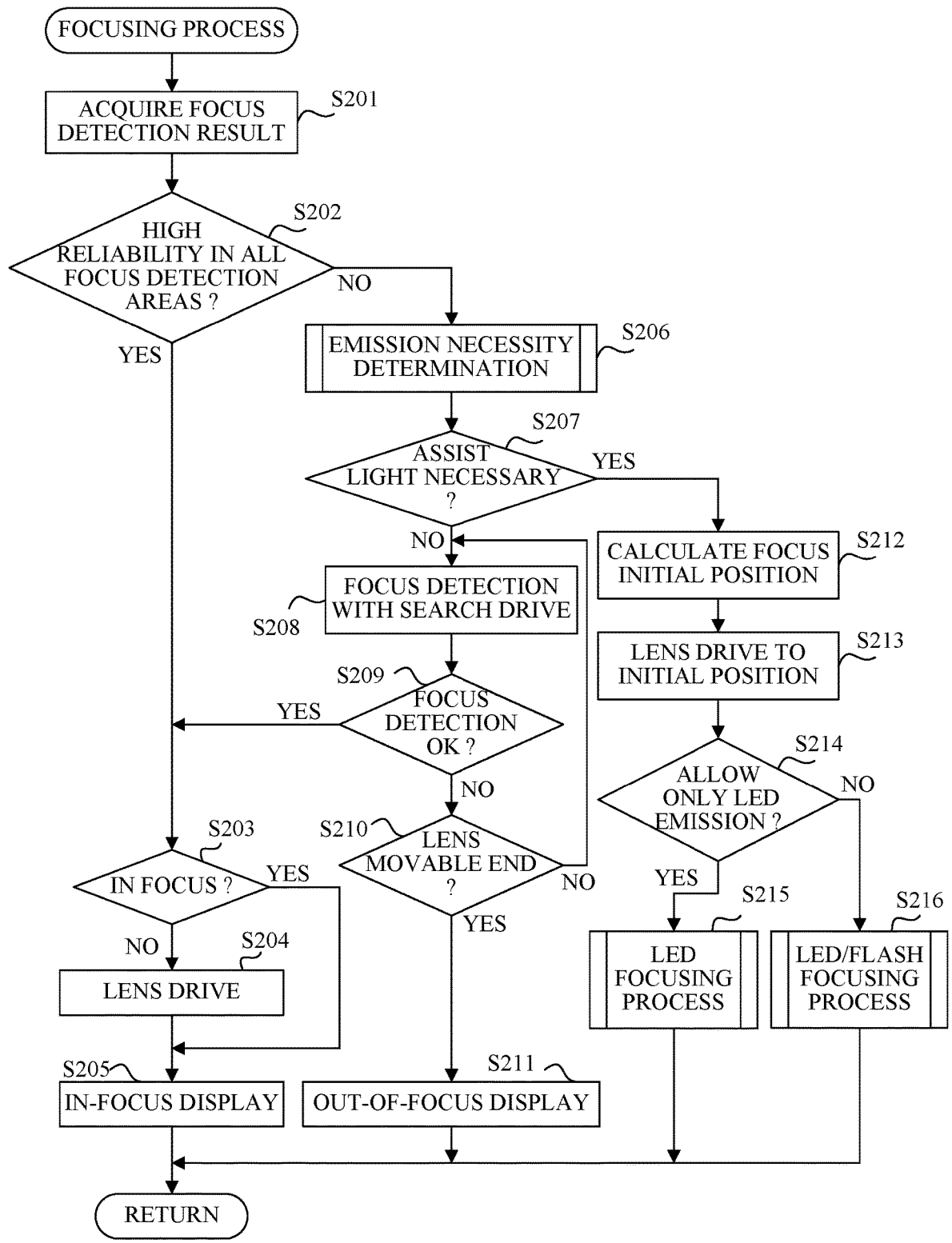
FIG. 7 illustrates a flowchart of a focusing process performed in Embodiment 1.

Processes from at next S502 to S510 are the same, as illustrated by step numbers in parentheses, as those at S201 to S205 and S208 to S211 in FIG. 7.

Next, with reference to a flowchart of FIG. 13, description will be made of the LED/Flash focusing process performed at S216 in FIG. 7.

At S601, the system controller 50 determines whether only the emission of the flash assist light is allowed in the AF assist light necessity determination process performed beforehand. If the emission of the LED assist light is not allowed and the emission of the flash assist light is allowed, the system controller 50 proceeds to S605. If both the emission of the LED assist light and the emission of the flash assist light are allowed, the system controller 50 proceeds to S602.

At S602, the system controller 50 performs an object presence determination process. As described above, the LED assist light can be continuously emitted, and however is emitted to the narrow area and is likely to be subjected to the vignetting by the image-capturing lens 300. Thus, at S602, the system controller 50 determines whether an object that effectively receives the LED assist light is present. This object presence determination process will be described later in detail.

Next, at S603, the system controller 50 determines whether a determination that the object effectively receiving the LED assist light is present has been made. If the object is present, the system controller 50 proceeds to S604. If the object is not present, the system controller 50 proceeds to S605.

At S604, the system controller 50 performs the same LED focusing process as that performed at S215 in FIG. 7. At S605, the system controller 50 performs the flash focusing process. This flash focusing process will be described later in detail. The system controller 50 having finished the process at S604 or S605 ends the LED/Flash focusing process.

Next, with reference to a flowchart of FIG. 14, description will be made of the object presence determination process performed at S602 in FIG. 13. At S701, the system controller 50 acquires the photometry information in the focus detection area(s). At this step, the system controller 50 acquires the photometric value(s) corresponding to the focus detection area(s) set at S6 in FIG. 6.

Next, at S702, the system controller 50 causes the LED lamp 48 to emit the LED assist light. Then, at S703, the system controller 50 again acquires the photometric value(s) corresponding to the focus detection area(s).

Next, the system controller 50 causes the LED lamp 48 to stop the emission of the LED assist light. Then, at S705, the system controller 50 calculates a change amount from the photometric value acquired before the emission of the LED assist light at S701 to the photometric value acquired during the emission of the LED assist light at S703. The system controller 50 determines whether the object effectively receiving the LED assist light is present by utilizing that the photometric value changes due to the presence of the object illuminated with the LED assist light. Thus, the system controller 50 can detect a case where the object is located outside the area where the LED assist light reaches, a case where the LED assist light is not projected to the object due to the vignetting by the image-capturing lens 300, a case where the LED assist light does not reach the object because of a long object distance and others.

As another method of determining whether an object is present, a method can be employed which performs the focus detection during the emission of the LED assist light and determines that the object is present if the focus detection can be performed.

However, in this method, a determination may be made that the object is not present even though the object is present because the image-capturing lens 300 is largely defocused from the object and thereby the focus detection cannot be performed. Accordingly, the system controller 50 can perform, by determining whether the object is present by using the change amount of the photometric values acquired before and during the emission of the LED assist light, a proper object presence determination regardless of a defocus state of the image-capturing lens 300.

Next, at S705, the system controller 50 determines that, if in the focus detection area, the change amount of the photometric values acquired before and during the emission of the LED assist light is equal to or larger than a predetermined value, the object effectively receiving the LED assist light is present. Then, the system controller 50 ends this object presence determination process.

Figure 14:
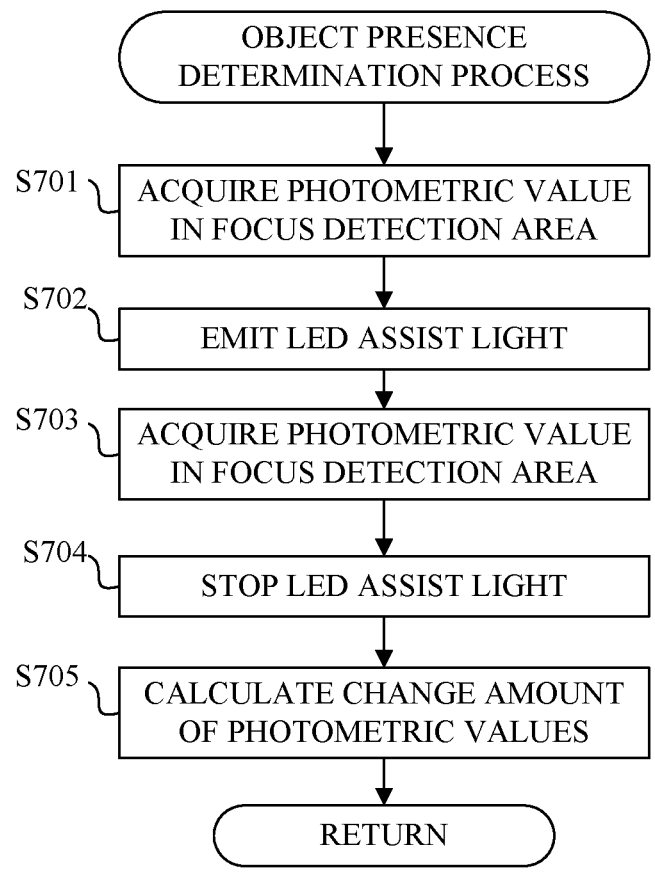
FIG. 14 illustrates a flowchart of an object presence determination process performed in Embodiment 1.
Figure 15:
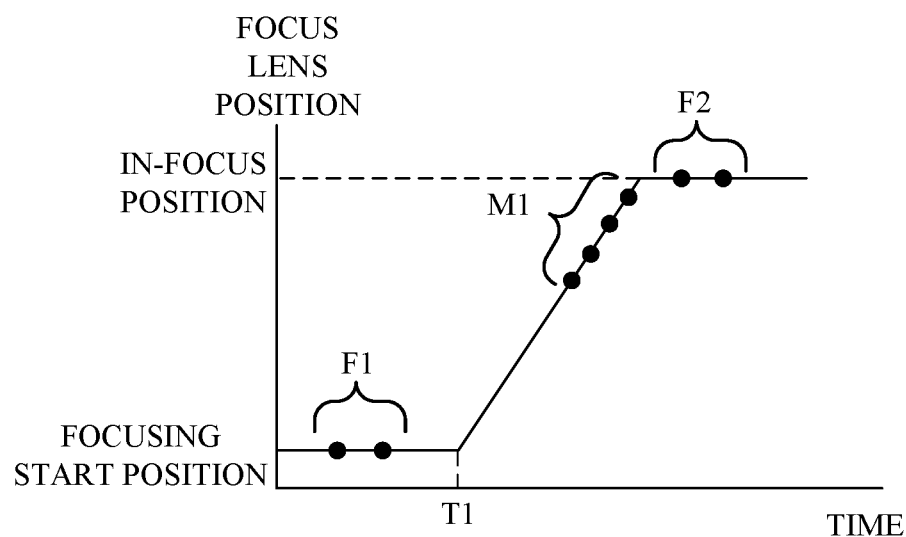
FIG. 15 illustrates positions of a focus lens in focusing.

Next, with reference to FIGS. 15, 16A and 16B, description will be made of the flash focusing process performed at S605 in FIG. 14. FIG. 15 illustrates a typical drive method of driving the focus lens 311 when the flash assist light is emitted and emission times of the flash assist light. A horizontal axis indicates time, and a vertical axis indicates position of the focus lens 311 (focus position). FIG. 15 illustrates changes of the focus position when the focus lens 311 is driven from a focusing start position where the flash focusing process is started to an in-focus position where an in-focus state is obtained. Black dots in FIG. 15 indicate the emission times of the flash assist light.

First, the system controller 50 stops the focus lens 311 at the focusing start position and causes the flash unit 48 to emit the flash assist light twice (F1).

The two emissions of the flash assist light are performed for acquiring the defocus amount at the start of focusing. The emission (intermittent emission) of the flash assist light performed in the state where the focus lens 311 is stopped is hereinafter referred to as "a step flash light emission". The focus detection process performing focus detection with the step flash light emission corresponds to a first focus detection process. The two emissions of the flash assist light will be described later in detail.

The system controller 50 detects the defocus amount using the flash assist light (F1), and then starts driving the focus lens 311 (time T1). After starting the focus lens drive, when the focus lens 311 approaches the in-focus position, the system controller 50 causes the flash unit 48 to intermittently emit the flash assist light while continuing the focus lens drive (M1). Continuous emission of the flash assist light during the focus lens drive increases power consumption of the camera 100. Thus, the system controller 50 starts the emission of the flash assist light when the focus lens 311 reaches a position set depending on the defocus amount acquired before the focus lens drive. The intermittent emission of the flash assist light performed during the focus lens drive is hereinafter referred to as "a lens drive flash light emission". The focus detection process performing focus detection with the lens drive flash light emission corresponds to a second focus detection process.

The system controller 50 stops driving the focus lens 311 at the in-focus position corresponding to the defocus amount acquired by the focus detection process with the lens drive flash light emission. Thereafter, the system controller 50 again performs the step flash light emission (F2) to confirm whether the defocus amount is in a predetermined in-focus range. Then, the system controller 50 ends the flash focusing process.

Figure 16A:
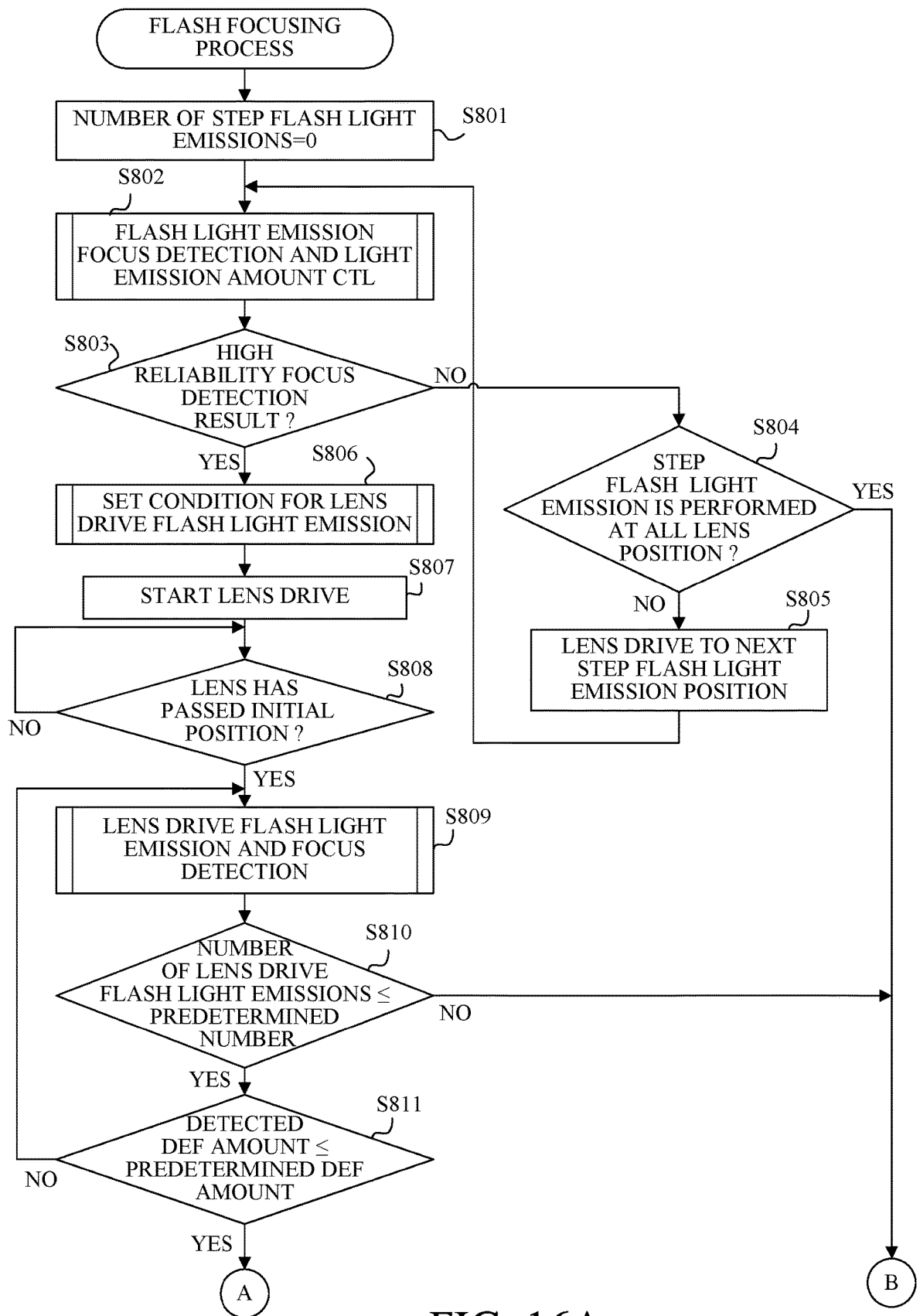
FIGS. 16A and 16B illustrate a flowchart of the flash focusing process performed in Embodiment 1.
Figure 16B:
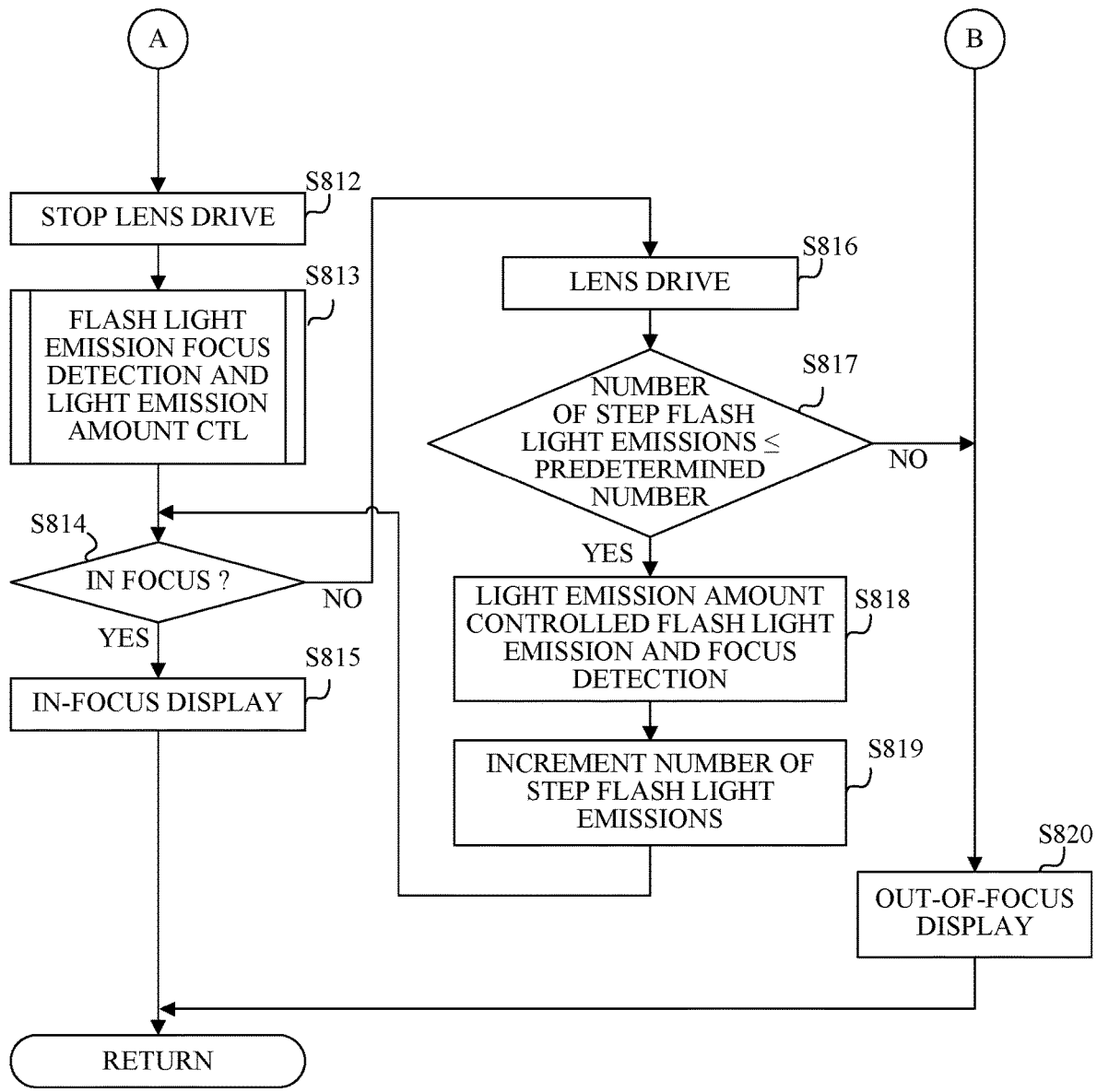

A flowchart of FIGS. 16A and 16B illustrate the focus detection with the step flash light emission in detail. At S801, the system controller 50 initializes a counted value of the number of step flash light emissions. This embodiment provides an upper limit of the number of step flash light emissions in order to reduce unwanted power consumption.

Next, at S802, the system controller 50 performs the focus detection process with the step flash light emission (that is, the first focus detection process) and light emission amount control. The system controller 50 that is performing the focus detection concurrently performs the light emission amount control for setting a light emission amount in the lens drive flash light emission. At S802, the system controller 50 selects the focus detection area where the focus detection is performed later.

Next, at S803, the system controller 50 determines whether a focus detection result whose reliability is high (that is, a focus detection result having a second reliability higher than a first reliability) has been obtained. If the focus detection result whose reliability is high has not been obtained (that is, the focus detection result only has the first reliability), the system controller 50 proceeds to S804 to determine whether the focus detection with the step flash light emission has been performed at all predetermined focus positions.

As described, in this embodiment the system controller 50 moves the focus lens 311 to the focus initial position for performing the flash light emission. When the focus detection cannot be performed at the focus initial position, the system controller 50 moves to the focus lens 311 toward the infinite side, stops the focus lens 311 and then performs the focus detection with the step flash light emission again. The number of attempt times of the focus detection with the step flash light emission is not limited.

For example, the focus detection with the step flash light emission may be performed in each defocus amount detectable range described above. In this case, the number of step flash light emissions is more than two. After the emission at the focus initial position, the step flash light emission may be performed at a position of the focus lens 311 farther on the close side than the infinite end by the defocus amount detectable range. In this case, a maximum number of step flash light emissions with which the focus detection cannot be performed becomes two, which enables a rapid determination whether focusing can be performed.

If determining at S804 that the focus detection with the step flash light emission has been performed at all the predetermined focus positions, the system controller 50 proceeds to S820 to determine that focusing cannot be performed, and then perform the same out-of-focus display as at S211. If determining at S804 that the focus detection with the step flash light emission has not been yet performed at all the predetermined focus positions, the system controller 50 proceeds to S805 to drive the focus lens 311 to a next focus position. Then, the system controller 50 returns to S802.

The system controller 50 having determined at S803 that the focus detection result whose reliability is high has been obtained proceeds to S806 to set a condition for the lens drive flash light emission. The condition of the lens drive flash light emission includes a defocus amount and a focus position (hereinafter referred to as "an emission start focus position") at which the emission is started, and further includes a drive speed of the focus lens 311. The condition will be described later in detail.

Next, at S807, the system controller 50 starts the focus lens drive according to the condition set at S806. Then, at S808, the system controller 50 determines whether the focus lens 311 has passed the emission start focus position set at S806. If the focus lens 311 has not yet passed the emission start focus position, the system controller 50 repeats the determination at S808 while continuing the focus lens drive.

On the other hand, if the focus lens 311 has passed the emission start focus position, the system controller 50 proceeds to S809 to perform the focus detection with the lens drive flash light emission (that is, the second focus detection process). At S809, the system controller 50 causes the flash unit 48 to emit the flash assist light in synchronization with a frame rate of image data production, and repeats the focus detection using the paired phase difference image signals obtained from the focus detection area set (selected) at S802. A detailed description will be made later.

Next, at S810, the system controller 50 determines whether the number of lens drive flash light emissions is equal to or less than a predetermined number. If the number of lens drive flash light emissions is larger than the predetermined number, the system controller 50 proceeds to S820 to stop the focus detection and perform the out-of-focus display. This is a process to regard an object detected before the focus lens drive as being lost due to movement of the object or a user's framing and thereby prevent an unwanted emission. If the number of lens drive flash light emissions is equal to or less than the predetermined number, the system controller 50 proceeds to S811.

At S811, the system controller 50 determines whether the defocus amount detected at S809 is equal to or less than the predetermined defocus amount. If the detected defocus amount is larger than the predetermined defocus amount, the system controller 50 returns to S809 to continue the focus detection with the lens drive flash light emission. If the detected defocus amount is equal to or less than the predetermined defocus amount, the system controller 50 proceeds to S812 to stop the focus lens drive.

Next, at S813, the system controller 50 performs, as at S802, the focus detection process with the step flash light emission (that is, while causing the flash unit 48 to intermittently emit the flash assist light) and the light emission amount control.

Performing again the light emission amount control near the in-focus position prevents the focus detection from being performed using paired phase difference image signals saturated due to a change in defocus state. For example, when the object includes a thin line, as a blur amount decreases from a blurred state to an in-focus state, a luminance level of the paired phase difference image signals increases and thereby the paired phase difference image signals are saturated. The saturated paired phase difference image signals cause a focus detection error, so that the light emission amount control is performed near the in-focus position.

The system controller 50 having finished the process at S813 determines at S814 whether the detected defocus amount is smaller than an in-focus determination threshold. If the detected defocus amount is smaller than the in-focus determination threshold, the system controller 50 proceeds to S815 to cause the image display unit 28 to perform the in-focus display as at S205, and then ends the flash focusing process.

The system controller 50 having determined that the detected defocus amount is equal to or larger than the in-focus determination threshold proceeds to S816 to perform the focus lens drive depending on the detected defocus amount.

After finishing (stopping) the focus lens drive at S816, the system controller 50 determines at S817 whether the number of step flash light emissions is equal to or less than a predetermined number. Since the step flash light emission has been performed before the focus lens drive is started, the system controller 50 uses, as the number of step flash light emissions in the determination, a total number of the step flash light emissions from before the focus lens drive is started. If the number of step flash light emissions is larger than the predetermined number, the system controller 50 proceeds to S820 to stop the focus detection and perform the out-of-focus display. If the number of step flash light emissions is equal to or less than the predetermined number, the system controller 50 proceeds to S818 to perform the focus detection with emission of the flash assist light whose light emission amount has been set depending on a result of the pre-performed light emission amount control. At this S818, since it is expected that the defocus state changes only slightly from S813, the system controller 50 performs the focus detection using the result of the light emission amount control obtained at S813 without newly performing the light emission amount control.

This enables the focus detection with a high accuracy without performing unwanted light emission. If the defocus amount detected at S813 is large and the defocus state at S818 is significantly changed from S813, the system controller 50 may newly perform the same process as that at S813.

Next, at S819, the system controller 50 increments the number of step flash light emissions, and then returns to S814.

Figure 17:
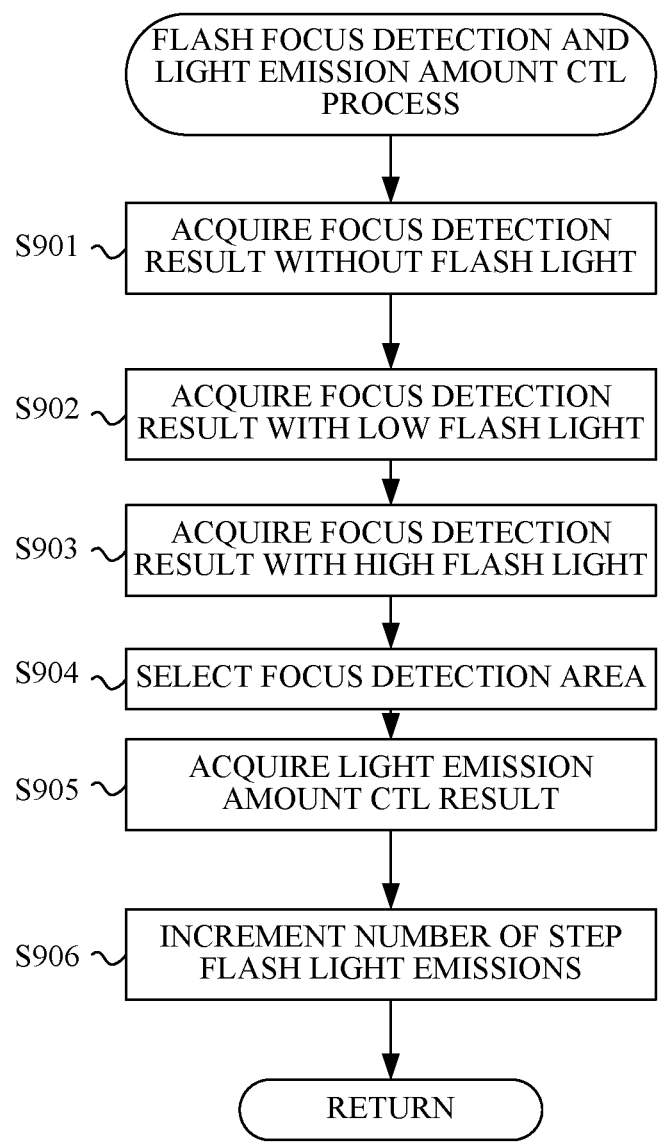
FIG. 17 illustrates a flowchart of a flash focus detection and light emission amount control process performed in Embodiment 1.

Next, with reference to a flowchart of FIG. 17, description will be made of the focus detection process with the step flash light emission, which is performed at S802 in FIG. 15. At S901, the system controller 50 performs the focus detection in one or more focus detection areas preset without the flash light emission, determines the reliability of the focus detection result, and selects and stores the focus detection result whose reliability is high.

Next, at S902, the system controller 50 causes the flash unit 48 to emit the flash light having a first light emission amount, performs the focus detection using the paired phase detection image signals in synchronization with the emission of the flash light, determines the reliability of the focus detection result, and selects and stores the focus detection result whose reliability is high.

Next, at S903, the system controller 50 causes the flash unit 48 to emit the flash light having a second light emission amount larger than the first light emission amount, performs the focus detection using the paired phase detection image signals in synchronization with the emission of the flash light, determines the reliability of the focus detection result, and selects and stores the focus detection result whose reliability is high.

Next, at S904, the system controller 50 uses the focus detection results acquired at S901, S902 and S903 to select the focus detection area in which focusing is performed among the multiple focus detection areas. Specifically, for example, the system controller 50 selects the focus detection area including a closest object as the focus detection area in which focusing is performed.

This is because a main object as a user's image capturing target is likely to be located at a close distance. However, the method of selecting the focus detection area in which focusing is performed is not limited thereto. For example, the system controller 50 may average multiple focus detection results acquired with mutually different flash light emission amounts and use the averaged focus detection result to select the focus detection area in which focusing is performed.

In general, a higher contrast of the paired phase difference image signals increases an accuracy of defocus amount detection. However, the above-described saturated paired phase difference image signals decrease the accuracy. In such a case, the system controller 50 may detect the saturated paired phase difference image signals acquired at S902 or S903 and eliminate a focus detection result acquired from the saturated paired phase difference image signals.

Next, at S905, the system controller 50 performs a light emission amount control process to acquire a light emission amount control result. The system controller 50 does not perform the light emission amount control process when the focus detection area selected at S904 is the focus detection area corresponding to the focus detection result selected at S901. In addition, in subsequent focus detection, the system controller 50 performs the focus detection without the AF assist light. On the other hand, the system controller 50 performs the light emission amount control process when the focus detection area selected at S904 is the focus detection area corresponding to the focus detection result selected at S902 or S903.

The system controller 50 further acquires a photometric value (photometric information) obtained in the selected focus detection area without the flash light and a photometric value in the selected focus detection area with the flash light having a light emission amount (first or second light emission amount) with which the selected focus detection result has been obtained. Then, the system controller 50 calculates, from a difference between the two photometric values, a necessary and sufficient light emission amount for performing focus detection.

When BV_n represents the photometric value obtained without the flash light, BV_af represents the photometric value obtained with the flash light, and BV_T represents the necessary and sufficient light emission amount for performing focus detection, the system controller 50 calculates a gain G for a reference light emission amount, that is, the flash light emission amount with which the selected focus detection result has been obtained by following expression (1):

$$G=(BV\_T-BV\_n)/(BV\_af-BV\_n) \quad (1)$$

Although expression (1) uses the photometric value in linear scale, photometric values in logarithmic scale are often used.

In this case, the system controller 50 may convert the photometric value in logarithmic scale into a photometric value in linear scale to calculate the gain G. The system controller 50 sets, from the calculated gain G and the reference light emission amount, a light emission amount of the flash assist light for subsequent focus detection. This enables setting a proper light emission amount, thereby making it possible to reduce unwanted power consumption and prevent a decrease in focus detection accuracy due to the saturated paired phase difference image signals.

The system controller 50 having finished the acquisition of the light emission amount control result proceeds to S906 to increment the number of step flash light emissions, and then ends this focus detection process with the step flash light emission.

Figure 18:
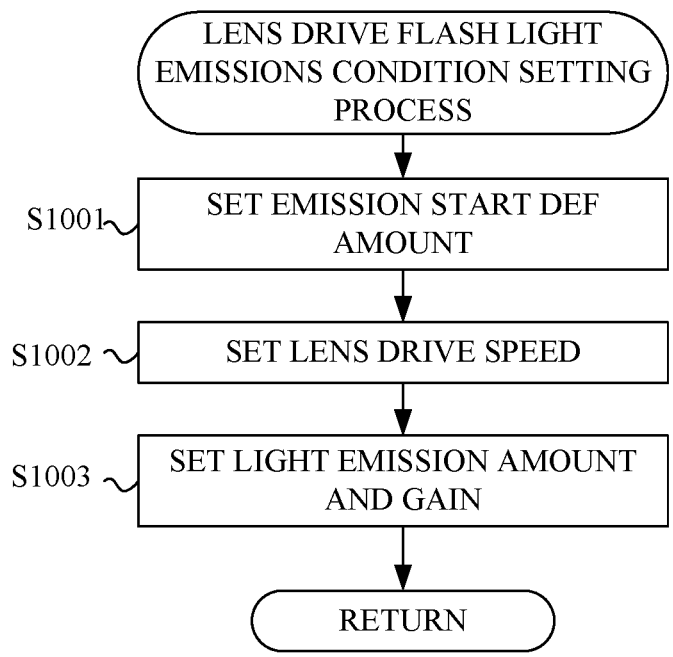
FIG. 18 illustrates a flowchart of a lens drive flash light emission condition setting process performed in Embodiment 1.

Next, with reference to a flowchart of FIG. 18, description will be made of the process to set the condition for the lens drive flash light emission (lens drive flash light condition setting process), which is performed at S806 of FIG. 16A. At S1001, the system controller 50 sets a defocus amount at which the lens drive flash light emission is started. As described with reference to FIG. 15, in order to reduce the power consumption, the system controller 50 starts the lens drive flash light emission after the focus lens 311 approaches the in-focus position. In this process, the system controller 50 uses information on the detectable defocus amount described at S212 in FIG. 7. A large defocus amount decrease a similarity of shapes of the paired phase difference image signals due to their blur, which results in focus detection error. Therefore, even in the detectable defocus amount range, a smaller defocus amount provides a more highly-accurate focus detection result. In this embodiment, the system controller 50 sets a value calculated by multiplying the detectable defocus amount by a coefficient $\alpha$ (for example, 0.5) as an emission start defocus amount (first predetermined defocus amount) at which the lens drive flash light emission is started. The system controller 50 sets the emission start defocus amount smaller as the number of flash light emissions from before the start of the lens drive flash light emission increases, in order to keep a light emission amount for recording image capturing after focusing. The system controller 50 converts the emission start defocus amount, together with information on a current focus position, into an emission start focus position.

Next, at S1002, the system controller 50 sets a focus lens drive speed (moving speed). Specifically, the system controller 50 sets the focus lens drive speed for performing a predetermined number of flash light emissions within a range of the emission start defocus amount set at S1001. For example, when a sampling rate of the paired phase difference image signals is 60 fps, and the number of flash light emissions within a range of the emission start defocus amount (mm) is five, the system controller 50 sets the focus lens drive speed to D/5×60 (mm/s). With this method, the system controller 50 sets the focus lens drive speed properly depending on the emission start defocus amount and the sampling rate of the paired phase difference image signals.

Next, at S1003, the system controller 50 adjusts (sets) the light emission amount in the lens drive flash emission or sets a gain for the image-capturing signal, using the light emission amount control result in the previous step flash light emission. The light emission amount adjustment and the gain setting are both effective for providing a necessary contrast to the paired phase difference image signals. The system controller 50 performs the light emission amount adjustment or the gain setting in consideration of flash light glare for objects such as persons and animals, power consumption and an S/N ratio of the paired phase difference image signals. For example, in order to increase the contrast of the paired phase difference image signals, the system controller 50 performs the gain setting when the object is a person, and performs the light emission amount adjustment when the object is not a person.

Specifically, the system controller 50 acquires multiple focus detection results by performing multiple focus detections with the step flash light emissions whose light emission amounts are mutually different in the respective focus detection or by setting mutually different gains for the output signals from the image sensor 14.

Then, the system controller 50 sets the light emission amount or the gain for subsequent focus detections. The system controller 50 may set the light emission amount or the gain, using in addition to the above-described multiple focus detection results, focus detection results acquired without the flash light from the flash unit 48.

The system controller 50 having finished the process at S1003 ends this lens drive flash light condition setting process.

Figure 19:
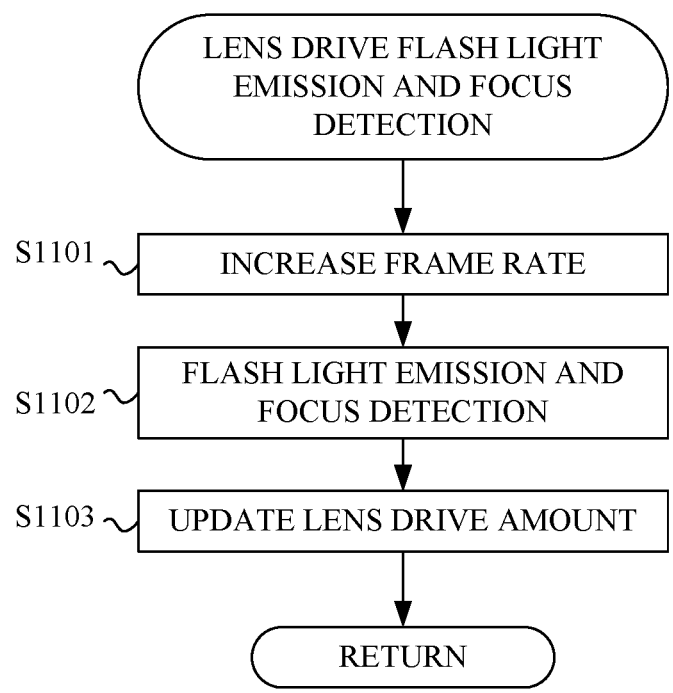
FIG. 19 illustrates a flowchart of a lens drive flash focus detection process performed in Embodiment 1.

Next, with reference to FIG. 19, description will be made of the lens drive flash emission and the focus detection performed at S809 in FIG. 16A. The system controller 50 can selectively set a frame rate in driving the image sensor 14 to a slow frame rate (first flame rate) and a fast frame rate (second frame rate).

At S1101, the system controller 50 sets the frame rate to the fast frame rate.

For example, the system controller 50 changes the frame rate from 30 fps as the slow frame rate to 60 fps as the fast frame rate. The flash light emission is performed in a very short time, and thereby it is unnecessary to set the exposure time of the image sensor 14 long. It is only necessary that the flash light emission be performed in synchronization with a time at which all the pixels of the image sensor 14 are exposed.

Thereby, as long as an area illuminated by the flash light emission is sufficiently wide, the paired phase difference image signals obtained from the entire pixel area of the image sensor 14 have a sufficient contrast. On the other hand, when the LED assist light is used, increasing the exposure time of the image sensor 14 increases the contrast of the paired phase difference image signals. Therefore, in this embodiment, the frame rate (second frame rate) set when the flash assist light is used is set faster than the frame rate (first frame rate) set when the LED assist light is used. This setting enables fast focusing when the flash assist light is used.

Furthermore, in this embodiment, the fast frame rate is set only when the lens drive flash light emission is performed. That is, the fast frame rate is used when the lens drive flash light emission is performed, and the slow frame rate is used when the step flash light emission is performed. The focus detection with the step flash light emission uses, as described above, also the focus detection result acquired without the flash light emission. Thus, increasing the frame rate when the step flash light emission is performed causes a necessity to change the frame rate before and after the flash light emission, which increases a time lag between the focus detections. In this embodiment, as described above, the focus detection area in which focusing is performed is selected by comparing the focus detection results respectively acquired when the flash light emission is not performed, when the flash light emission with the first light emission amount is performed and when the flash light emission with the second light emission amount is performed. Therefore, it is desirable to perform the focus detections under the same condition as far as possible. Therefore, in this embodiment, the frame rate is increased only when the lens drive flash light emission is performed.

However, in a case where a time necessary for changing the frame rate is short, the frame rate may be increased when the lens drive flash light emission is not performed. That is, the focus detections with the step flash light emission may be performed with proper changing of the frame rate between when the flash light emission is not used and when the flash light emission is used.

Moreover, as described above, when the lens drive flash light emission is performed, the focus detection result whose reliability is high is likely to be acquired. A small focus lens drive amount calculated from the focus detection result does not make the focusing significantly faster, so that it is unnecessary to change the frame rate to the fast frame rate.

In addition, in a case where the focus detection area is not selected when the lens drive flash light emission is performed and highly-reliable focus detection results are obtained both when the flash light emission is used and when the flash light emission is not used, it is unnecessary to change the frame rate to the fast frame rate. This enables proper focusing for an image-capturing scene including a far distance object that the flash light does not reach and a close distance object that the flash light reaches.

Next, at S1102, the system controller 50 performs the flash light emission and the focus detection. The system controller 50 calculates the defocus amount using the paired phase difference image signals acquired by the focus detection with the flash light emission whose light emission amount has been preset.

Then, at S1103, the lens system controller 50 updates the focus lens drive amount depending on the calculated defocus amount. In the flash light emission and the focus detection during the focus lens drive, a focus detection error decreases as the detected defocus amount becomes smaller. Thus, updating the focus lens drive amount, that is, a target position of the focus lens 311 as described above enables highly-accurate focusing.

In this embodiment, the focus detection using the intermittently emitted flash assist light with the focus lens being stopped and the focus detection using the above flash assist light with the focus lens being driven (moved) are switched depending on whether the focus detection result has a high reliability. This enables fast focusing while reducing unwanted flash assist light emission when a highly-reliable focus detection result is not obtained.

The above embodiment described the case of performing focusing using a reliable focus detection result acquired at S809.

However, a determination of the reliability of the focus detection result may be made from a difference between a defocus amount (second detected defocus amount) detected at a certain focus position as a first position during the focus lens drive and an estimated defocus amount that is estimated (calculated) for a state where the focus lens is driven from the first position to another position as a second position, using a result (first detected defocus amount) of the focus detection with the step flash light emission, which has been acquired at the first position before the focus lens drive. When the difference between these two defocus amounts is large (that is, the difference is larger than a predetermined difference), there is a possibility that the object has largely moved or an image-capturing direction of the camera 100 has been largely changed.

In such a case, the focus lens drive and the focus detection may be stopped. This enables promptly finishing the focusing process using an unreliable focus detection result. Restarting the focusing process as necessary by a user enables reducing the time required for the focusing process for an image-capturing target object.

An allowable number of flash light emissions during the focus lens drive, which was described at S810, may be variable depending on the number of step flash light emissions before the focus lens drive. As described above, in order to reduce the power consumption and keep the light emission amount for the recording image capturing after the focusing, the allowable number of flash light emissions during the focus lens drive may be properly set. When increasing the number of flash light emissions, increasing the emission start defocus amount enables reducing an influence of an object's movement during the focus lens drive, which enables performing a more reliable focus detection.

In this embodiment, the flash light emissions are performed with the predetermined mutually different light emission amounts, and the paired phase difference image signals acquired therewith are used for selecting the focus detection area and calculating the defocus amount. Furthermore, in this embodiment, the light emission amount with which the selected focus detection result is obtained is set to the reference light emission amount, and the light emission amount control for adjusting the subsequent light emission amount is performed using the reference light emission amount. This eliminates a necessity of the light emission amount control before the focus detection, thereby enabling fast focusing. Moreover, performing the light emission amount control with the step flash light emission enables acquiring a highly-reliable focus detection result by one flash light emission. This enables reducing the number of lens drive flash light emissions and the number of subsequent step flash light emissions.

In addition, in this embodiment, the contrast of the paired phase difference image signals (that is, of the object) is adjusted mainly by adjusting the light emission amount. However, the contrast of the paired phase difference image signals may be adjusted by adjusting a gain for the image-capturing signal read out from the image sensor 14. The adjustment of the light emission amount is effective for the adjustment of the contrast of an object that is closer and has a higher reflectance, which improves the S/N ratio of the paired phase difference image signals. On the other hand, the adjustment of the gain does not improve the S/N ratio of the paired phase difference image signals, but enables performing the adjustment of the contrast more easily regardless of the object's distance and reflectance.

Moreover, the above embodiment described the case where the focus detection area is selected before the lens drive flash light emission. However, in a mode such as the above-described automatic selection mode that does not select the focus detection area even though a highly-reliable focus detection result is obtained, the light emission amount cannot be adjusted for the respective focus detection areas.

In this case, the light emission amount may be selected from the first light emission amount, the second light emission amount and 0 (no light emission). For example, the light emission amount with which a greater number of focus detection results is obtained or which correspond to a focus detection result indicating presence of a closer object may be selected Embodiment 2

Next, description will be made of a second embodiment (Embodiment 2) of the present invention. Constituent elements in this embodiment common to those in Embodiment 1 are denoted by the same reference numerals as those in Embodiment 1, and description thereof is omitted. In this embodiment, description will be mainly made of differences from Embodiment 1.

Figure 13:
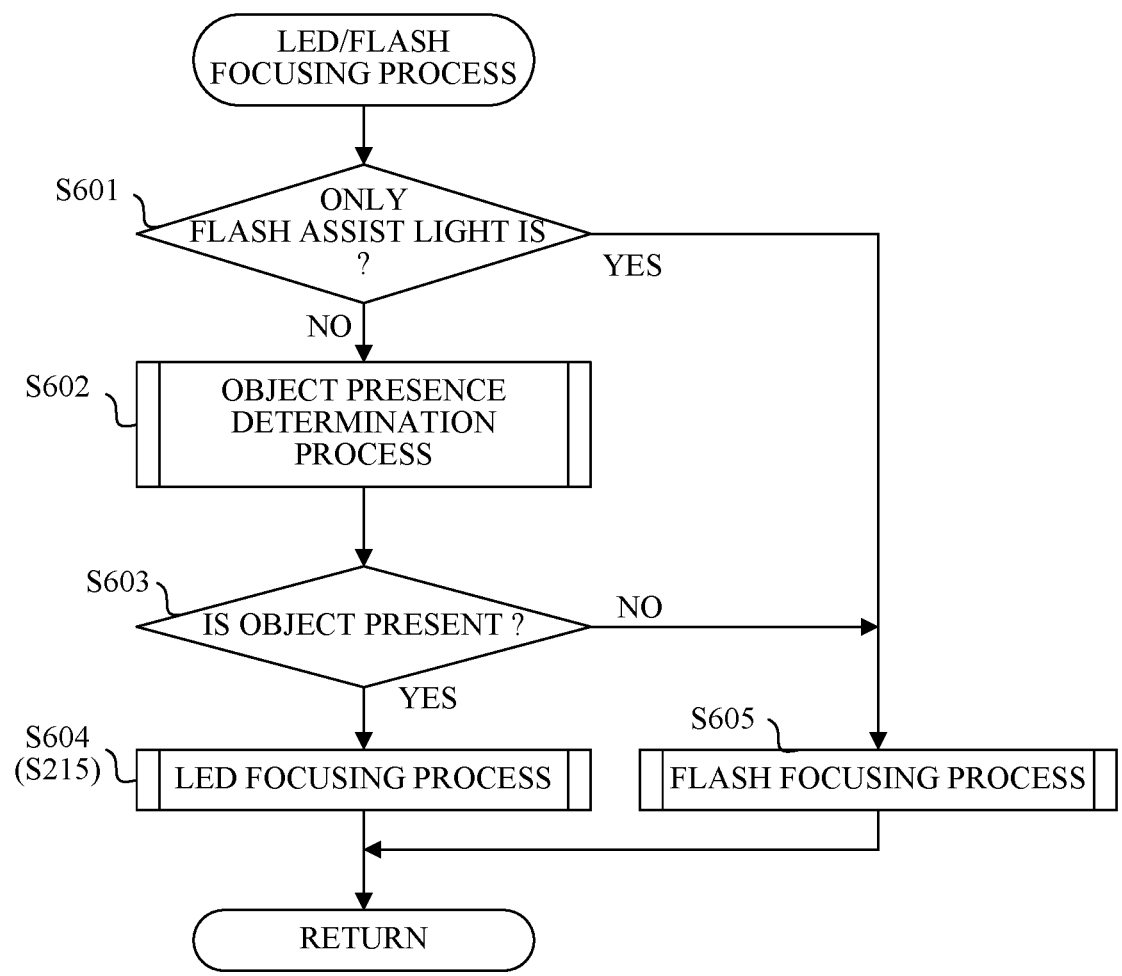
FIG. 13 illustrates a flowchart of an LED/flash focusing process performed in Embodiment 1.
Figure 20:
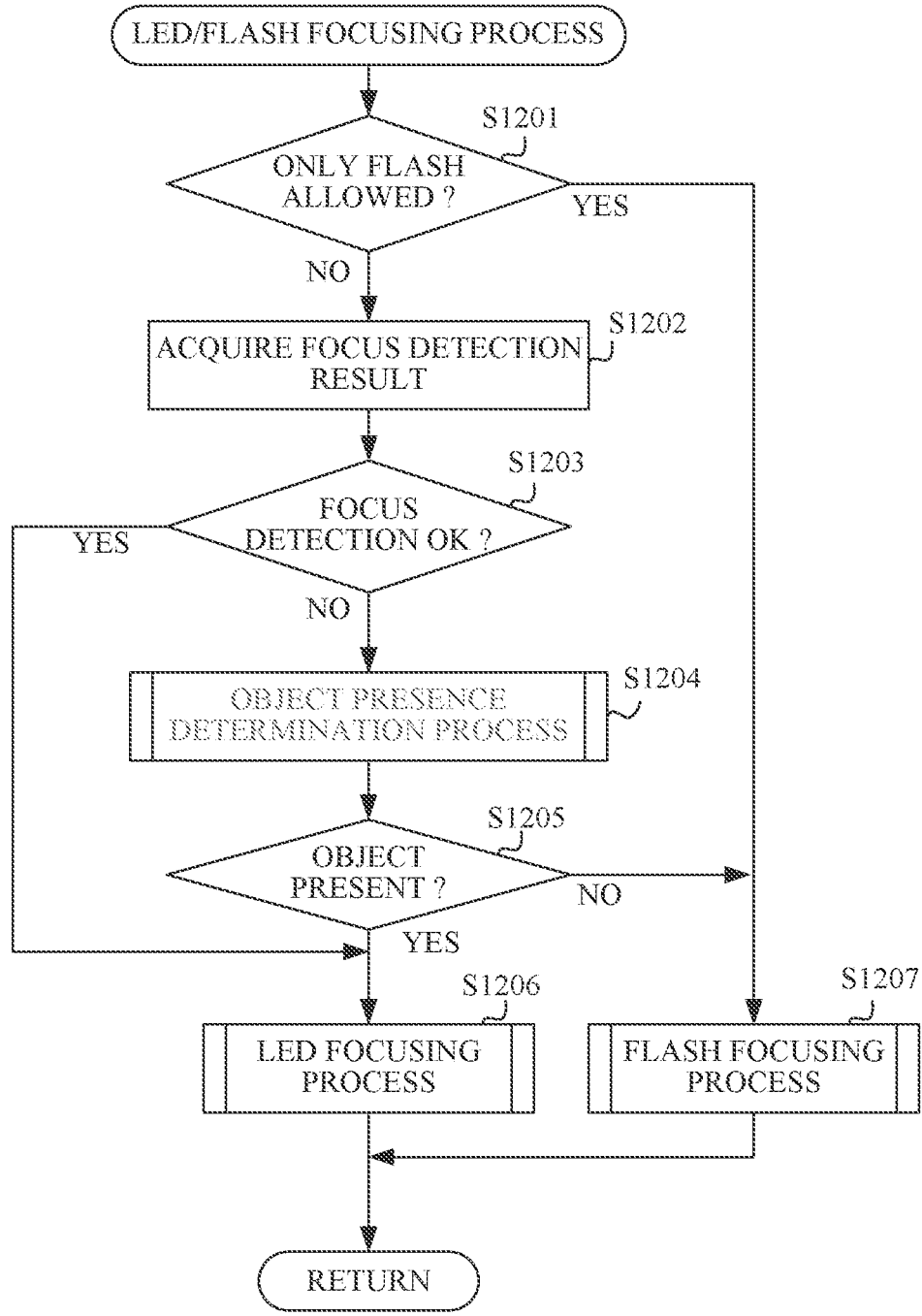
FIG. 20 illustrates a flowchart of an LED/flash focusing process performed in Embodiment 2 of the present invention.

A flowchart of FIG. 20 illustrates an LED/flash focusing process in Embodiment 2, which is performed at S206 in FIG. 7 instead of the LED/flash focusing process illustrated in FIG. 13 in Embodiment 1.

At S1201, the system controller 50 determines whether only the emission of the flash assist light is allowed in the AF assist light necessity determination process performed beforehand. If the emission of the LED assist light is not allowed and the emission of the flash assist light is allowed, the system controller 50 proceeds to S1207. If both the emission of the LED assist light and the emission of the flash assist light are allowed, the system controller 50 proceeds to S1202.

At S1202, the system controller 50 acquires a defocus amount as a result of the focus detection performed at S4 in Embodiment 1. The system controller 50 further determines whether the acquired defocus amount has a high reliability. If the defocus amount has a high reliability, the system controller 50 proceeds to S1203.

At S1203, the system controller 50 determines whether a defocus amount whose reliability is high has been detected in each focus detection area set according to the focus detection area mode acquired at S6 in Embodiment 1. If the defocus amount whose reliability is high has been detected in each set focus detection area, the system controller 50 proceeds to S1206, and otherwise the system controller 50 proceeds to S1204. The reason for proceeding from S1203 to S1206 only when the defocus amount whose reliability is high has been detected in each set focus detection area is that the reliability may become high in any of the focus detection areas due to emission of the AF assist light. The system controller 50 attempts the focus detection using the AF assist light when the reliability is low in any set focus detection area.

However, when the number of focus detection areas is large, it is unnecessary to use no AF assist light only when the reliability in each set focus detection area is high. For example, a determination of using no AF assist light may be made when the reliability is high only in the focus detection area whose image height is near 0.

At S1204, the system controller 50 determines whether an object that effectively receives the LED assist light is present. This object presence determination process is the same as the object presence determination process described with reference to the flowchart of FIG. 11 in Embodiment 1.

Next, at S1205, the system controller 50 determines whether a determination that the object effectively receiving the LED assist light is present has been made. If the object is present, the system controller 50 proceeds to S1206. If the object is not present, the system controller 50 proceeds to S1207.

7. On the other hand, at S1207, the system controller 50 performs a flash focusing process. The flash focusing process performed at this step will be described later in detail. The system controller 50 having finished the process at S1206 or S1207 ends the LED/Flash focusing process.

Figure 21A:
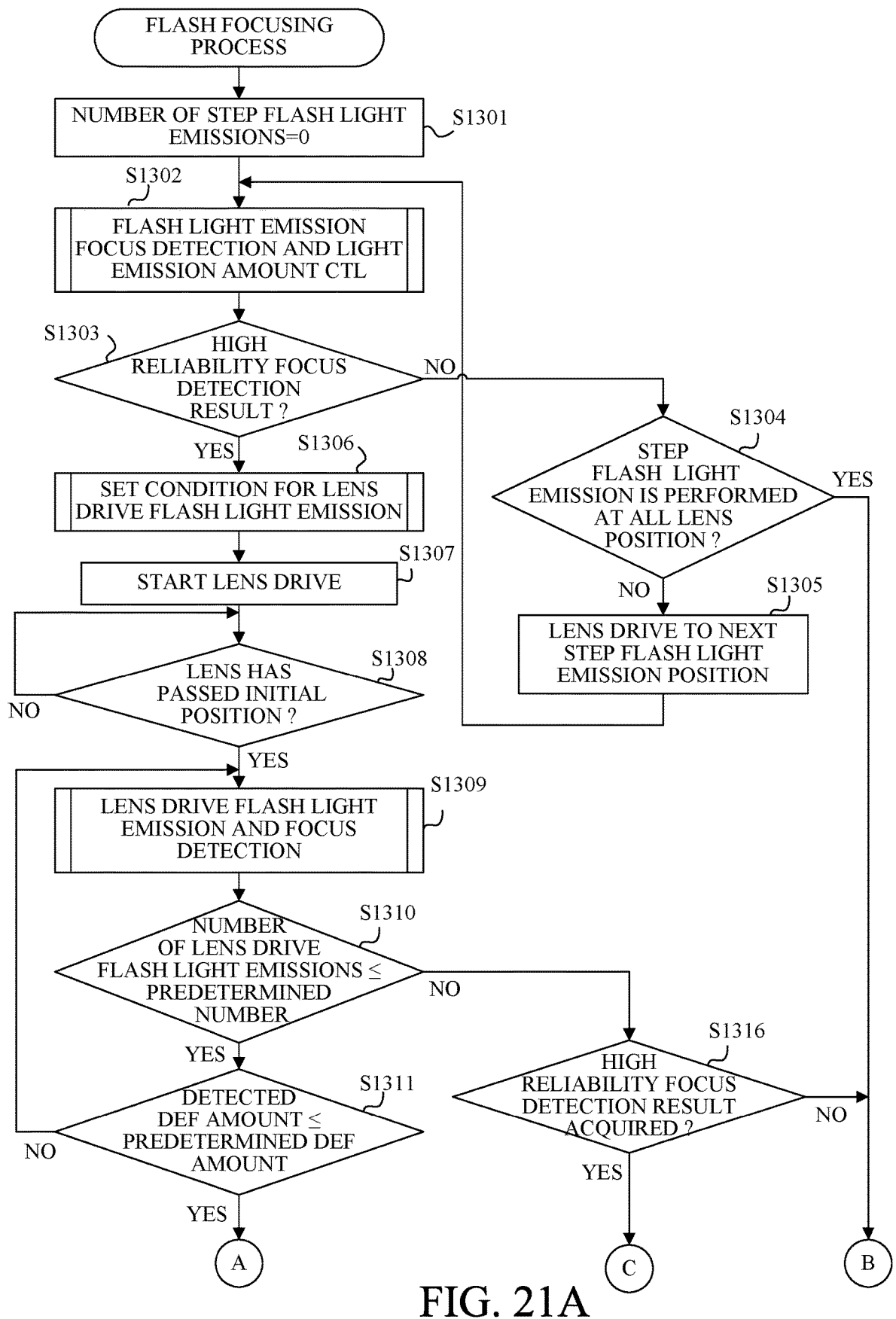
FIGS. 21A and 21B illustrate a flowchart of the flash assist light focusing process performed in Embodiment 2.
Figure 21B:
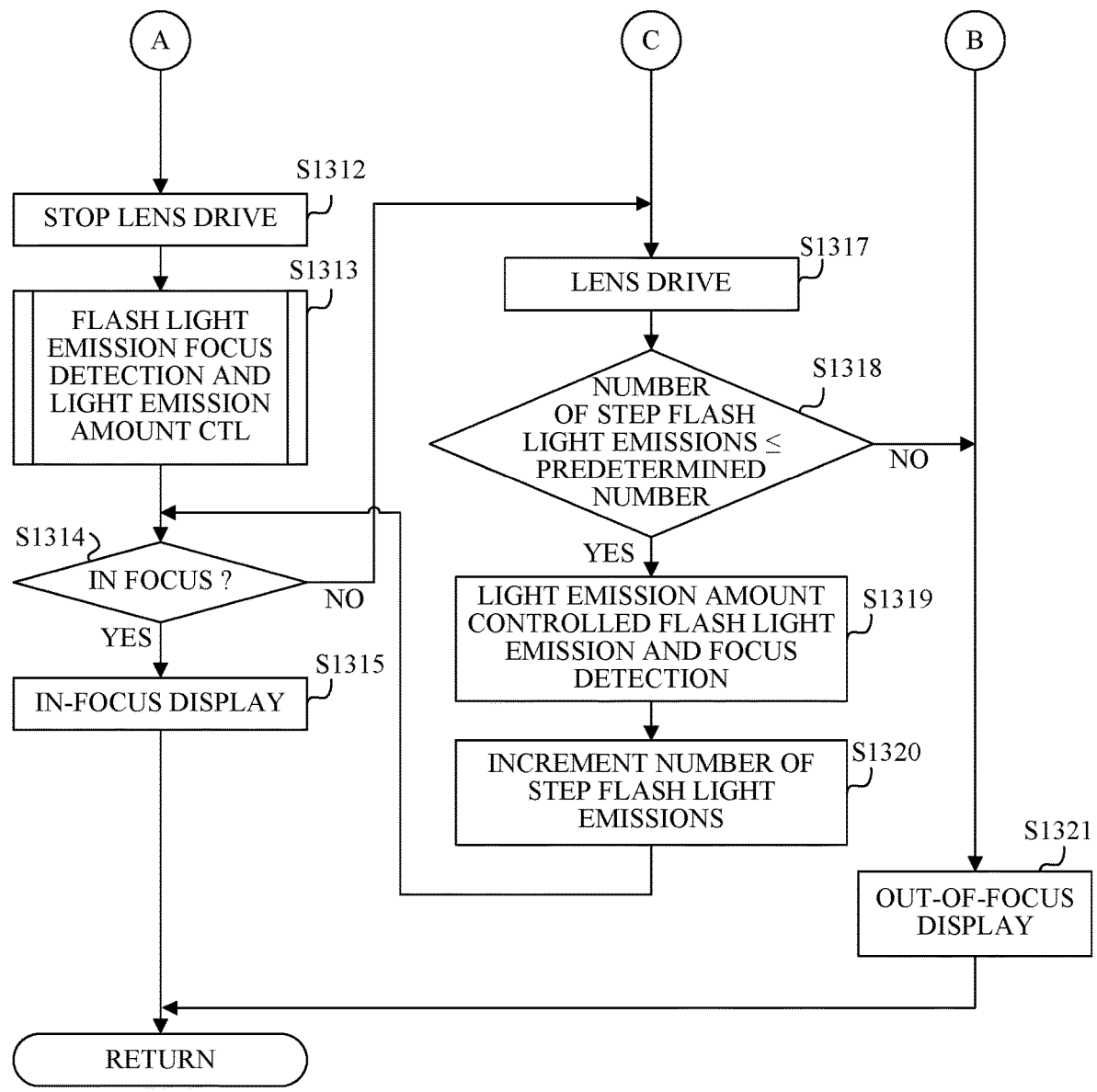

Next, with reference to FIGS. 21A and 21B, description will be made of the flash focusing process performed by the camera controller 50 at S1207 in FIG. 20.

At S1301, the system controller 50 initializes a counted value of the number of step flash light emissions. The step flash light emission was described in Embodiment 1. This embodiment also provides an upper limit of the number of step flash light emissions in order to reduce unwanted power consumption.

Next, at S1302, the system controller 50 performs the focus detection process with the step flash light emission (that is, a first focus detection process) and light emission amount control. The system controller 50 that is performing the focus detection concurrently performs the light emission amount control for setting a light emission amount in the lens drive flash light emission. At S1302, the system controller 50 selects the focus detection area where the focus detection is performed later.

Next, at S1303, the system controller 50 determines whether a focus detection result whose reliability is high (that is, a focus detection result having a second reliability higher than a first reliability) has been obtained. If the focus detection result whose reliability is high has not been obtained (that is, the focus detection result only has the first reliability), the system controller 50 proceeds to S1304 to determine whether the focus detection with the step flash light emission has been performed at all predetermined focus positions.

Also in this embodiment the system controller 50 moves the focus lens 311 to the focus initial position, which was described in Embodiment 1, for performing the flash light emission. When the focus detection cannot be performed at the focus initial position, the system controller 50 moves to the focus lens 311 toward the infinite side, stops the focus lens 311 and then performs the focus detection with the step flash light emission again. The number of attempt times of the focus detection with the step flash light emission is not limited. For example, the focus detection with the step flash light emission may be performed in each defocus amount detectable range described above. In this case, the number of step flash light emissions is more than two. After the emission at the focus initial position, the step flash light emission may be performed at a position of the focus lens 311 farther on the close side than the infinite end by the defocus amount detectable range. In this case, a maximum number of step flash light emissions with which the focus detection cannot be performed becomes two, which enables a rapid determination whether focusing can be performed.

If determining at S1304 that the focus detection with the step flash light emission has been performed at all the predetermined focus positions, the system controller 50 proceeds to S1320 to determine that the focus detection cannot be performed and then perform the same out-of-focus display as at S211. If determining at S1304 that the focus detection with the step flash light emission has not been yet performed at all the predetermined focus positions, the system controller 50 proceeds to S1305 to drive the focus lens 311 to a next focus position. Then, the system controller 50 returns to S1302. The system controller 50 having determined at S1303 that the focus detection result whose reliability is high has been obtained proceeds to S1306 to set a condition for a lens drive flash light emission. The lens drive flash light emission was described in Embodiment 1. The condition of the lens drive flash light emission includes, as the condition described in Embodiment 1 with reference to FIG. 18, the defocus amount and the emission start focus position at which the emission is started, and further includes the drive speed of the focus lens 311.

Next, at S1307, the system controller 50 starts the focus lens drive according to the condition set at S1306. Then, at S1308, the system controller 50 determines whether the focus lens 311 has passed the emission start focus position set at S1306. If the focus lens 311 has not yet passed the emission start focus position, the system controller 50 repeats the determination at S1308 while continuing the focus lens drive. On the other hand, if the focus lens 311 has passed the emission start focus position, the system controller 50 proceeds to S1309 to perform the focus detection with the lens drive flash light emission (that is, a second focus detection process). At S1309, the system controller 50 causes the flash unit 48 to emit the flash assist light in synchronization with a frame rate of image data production, and repeats the focus detection using the paired phase difference image signals obtained from the focus detection area set (selected) at S1302. These lens drive flash emission and the focus detection are the same as those described with reference to FIG. 19 in Embodiment 1.

Next, at S1310, the system controller 50 determines whether the number of lens drive flash light emissions is equal to or less than a predetermined number. If the number of lens drive flash light emissions is larger than the predetermined number, the system controller 50 proceeds to S1316. If the number of lens drive flash light emissions is equal to or less than the predetermined number, the system controller 50 proceeds to S1311.

At S1311, the system controller 50 determines whether the defocus amount detected at S1309 is equal to or less than the predetermined defocus amount. In other words, the system controller 50 determines whether the detected defocus amount includes only a small error and thereby enables the focus lens 311 to move to an in-focus position. If the detected defocus amount is larger than the predetermined defocus amount, the system controller 50 returns to S1309 to continue the focus detection with the lens drive flash light emission. If the detected defocus amount is equal to or less than the predetermined defocus amount, the system controller 50 proceeds to S1312 to stop the focus lens drive, and then proceeds to S1313.

At S1313, the system controller 50 performs, when obtaining a focus detection result having a third reliability higher than the second reliability, the focus detection process with the step flash light emission (that is, while causing the flash unit 48 to intermittently emit the flash assist light) and the light emission amount control. The third reliability is given to the detected defocus amount enabling the focus lens 311 to move to the in-focus position. The focus detection process with the step flash light emission and the light emission amount control performed at this step correspond to a third focus detection process. The detailed process at S1313 is the same as that described with reference to FIG. 17 in Embodiment 1. Performing again the light emission amount control near the in-focus position prevents the focus detection from being performed using paired phase difference image signals saturated due to a change in defocus state. For example, when the object includes a thin line, as a blur amount decreases from a blurred state to an in-focus state, a luminance level of the paired phase difference image signals increases and thereby the paired phase difference image signals are saturated. The saturated paired phase difference image signals cause a focus detection error, so that the light emission amount control is performed near the in-focus position. The system controller 50 having finished the process at S1313 determines at S1314 whether the detected defocus amount is smaller than an in-focus determination threshold. If the detected defocus amount is smaller than the in-focus determination threshold, the system controller 50 proceeds to S1315 to cause the image display unit 28 to perform the in-focus display as at S205 in FIG. 7 in Embodiment 1, and then ends the flash focusing process.

The system controller 50 having determined that the detected defocus amount (having a reliability equal to or lower than the third reliability) is equal to or larger than the in-focus determination threshold proceeds to S1717 to perform the focus lens drive depending on the detected defocus amount.

On the other hand, the system controller 50 having proceeded from S1310 to S1316 determines whether a focus detection result whose reliability is high (that is, a focus detection result having the second reliability higher than the first reliability) has been obtained. If the focus detection result whose reliability is high has not been obtained (that is, the focus detection result only has the first reliability), the system controller 50 proceeds to S1321 to determine that focusing cannot be performed, and then perform the same out-of-focus display as at S211 in FIG. 7.

The system controller 50 having determined at S1316 that the focus detection result whose reliability is equal to or higher than the second reliability has been obtained proceeds to S1317 to perform the focus lens drive depending on the detected defocus amount. This process corresponds to a fourth focus detection process. The fourth focus detection process is a process to perform, since the focus detection result whose reliability is the second reliability or higher has been obtained though the number of lens drive flash emissions has reached the upper limit (predetermined number), the focus lens drive without further flash light emission. The fourth focus detection process enables the focus lens drive depending on the detected defocus amount without the flash light emission, and thereby enables continuing focusing without an out-of-focus determination even after the number of flash light emissions reaches the predetermined number. The system controller 50 having determined at S1316 that only the focus detection result whose reliability is lower than the second reliability has been obtained regards the focus detection as being impossible to proceed to S1321.

At S1316, in a case where the number of lens drive flash light emissions is smaller than the predetermined number, the focus lens 311 stops after passing the in-focus position due to a high speed focus lens drive or the like. In such a case, if the focus detection result whose reliability is equal to or higher than the second reliability has been obtained, the fourth focus detection process may be performed.

After finishing (stopping) the focus lens drive at S1317, the system controller 50 determines at S1318 whether the number of step flash light emissions is equal to or less than a predetermined number. Since the step flash light emission has been performed before the focus lens drive is started, the system controller 50 uses, as the number of step flash light emissions in the determination, a total number of the step flash light emissions from before the focus lens drive is started. If the number of step flash light emissions is larger than the predetermined number, the system controller 50 proceeds to S1321 to stop the focus detection and perform the out-of-focus display.

If the number of step flash light emissions is equal to or less than the predetermined number, the system controller 50 proceeds to S1319 to perform the focus detection with emission of the flash assist light whose light emission amount has been set depending on a result of the pre-performed light emission amount control. At this S1319, since it is expected that the defocus state changes only slightly from S1313, the system controller 50 performs the focus detection using the result of the light emission amount control obtained at S1313 without newly performing the light emission amount control. This enables the focus detection with a high accuracy without performing unwanted light emission. If the defocus amount detected at S1313 is large and the defocus state at S1319 is significantly changed from S1313, the system controller 50 may newly perform the same process as that at S1313.

Next, at S1320, the system controller 50 increments the number of step flash light emissions, and then returns to S1314.

As described above, in this embodiment, when the defocus amount whose reliability is high is detected after the number of lens drive flash light emissions reaches the upper limit, the focus lens drive is performed depending on the detected defocus amount without the flash light emission, and then the focus detection with the step flash light emission is performed. Thereby, the focus lens can be moved to the in-focus position. Accordingly, good focus detection can be performed using the flash assist light that provides a proper luminance to objects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-213674, filed on Nov. 6, 2017 and Japanese Patent Application No. 2018-123724, filed on Jun. 28, 2018, which are hereby incorporated by reference herein in their entirety.

What is claimed is:
1. An image-capturing apparatus comprising:
an image sensor including a plurality of pixels arranged in a matrix, the plurality of pixels configured to output a signal by photoelectrically converting a light flux passing through an image-capturing optical system; and
a focus detector configured to perform a focus detection process using an output from the image sensor; and
a controller,
wherein the image-capturing apparatus has a first focus detection mode and a second focus detection mode,
wherein in the first focus detection mode, the focus detector performs the focus detection process using a first output from the image sensor, the first output being obtained by controlling a first assist light emitter so as to emit a flash assist light in synchronization with a timing when the image sensor is exposed, and wherein in the second focus detection mode, the focus detector performs the focus detection process using a second output from the image sensor, the second output being obtained by controlling a second assist light emitter so as to emit a constant assist light, wherein the controller causes the focus detector to perform the focus detection process in the second focus detection mode in a case where a photometric value acquired when the constant assist light is emitted from the second assist light emitter has a predetermined change with respect to a photometric value acquired before the constant assist light is emitted, and to perform the focus detection process in the first focus detection mode in a case where the photometric value acquired when the constant assist light is emitted does not have the predetermined change with respect to the photometric value acquired before the constant assist light is emitted.

2. The image-capturing apparatus according to claim 1, wherein the first assist light emitter intermittently emits the flash assist light for illuminating an object, and wherein the second assist light emitter is capable of constantly emitting an LED light as the constant assist light.

3. The image-capturing apparatus according to claim 1 further comprising:

a display controller configured to perform a control so that a live view image based on an image signal output from the image sensor is displayed on an image display unit.

4. The image-capturing apparatus according to claim 3, wherein the display controller performs the control so that in the first focus detection modes, a display of the live view image is stopped during emission of the flash assist light from the first assist light emitter, and in the second focus detection mode, the display of the live view image is not stopped during emission of the constant assist light from the second assist light emitter.

5. The image-capturing apparatus according to claim 1, wherein the plurality of pixels of the image sensor is capable of outputting a paired phase difference image signal by photoelectrically converting a light flux passing through different pupil areas of the image-capturing optical system, and wherein the focus detector performs the focus detection process using the paired phase difference image signal output from the plurality of pixels.

6. The image-capturing apparatus according to claim 1, wherein in the first focus detection mode, the focus detector selectively performs:

a first focus detection process as the focus detection process with a focus element included in the image-capturing optical system being stopped while causing the first assist light emitter to intermittently emit the flash assist light; and a second focus detection process as the focus detection process with the focus element being moved while causing the first assist light emitter to intermittently emit the flash assist light.

7. The image-capturing apparatus according to claim 6, wherein in the first focus detection mode, the focus detector performs the first focus detection process when a defocus amount obtained by the second focus detection process is smaller than a first predetermined defocus amount.

8. The image-capturing apparatus according to claim 7, wherein in the first focus detection mode, the focus detector sets the first predetermined defocus amount smaller as a number of emissions of the first assist light emitter increases, the number of emissions being counted from before the second focus detection process.

9. The image-capturing apparatus according to claim 6, wherein in the first focus detection mode, the focus detector stops the second focus detection process when a number of emissions of the first assist light emitter exceeds a predetermined number.

10. The image-capturing apparatus according to claim 6, wherein in the first focus detection mode, the image sensor is driven at a first frame rate when performing the first focus detection process, and the image sensor is driven at a second frame rate higher than the first frame rate when performing the second focus detection process.

11. A method of controlling an image-capturing apparatus comprising an image sensor including a plurality of pixels arranged in a matrix, the plurality of pixels being configured to output a signal by photoelectrically converting a light flux passing through an image-capturing optical system, the method comprising the steps of:

performing a focus detection process in a first focus detection mode; and performing the focus detection process in a second focus detection mode, wherein in the first focus detection mode, the focus detection process is performed using a first output from the image sensor, the first output being obtained by controlling a first assist light emitter so as to emit a flash assist light in synchronization with a timing when the image sensor is exposed, and wherein in the second focus detection mode, the focus detection process is performed using a second output from the image sensor, the second output being obtained by controlling a second assist light emitter so as to emit a constant assist light, wherein the method performs the focus detection process in the second focus detection mode in a case where a photometric value acquired when the constant assist light is emitted from the second assist light emitter has a predetermined change with respect to a photometric value acquired before the constant assist light is emitted, and to perform the focus detection process in the first focus detection mode in a case where the photometric value acquired when the constant assist light is emitted does not have the predetermined change with respect to the photometric value acquired before the constant assist light is emitted.

* * * * *